United States Patent
Wu

(10) Patent No.: US 7,957,581 B2
(45) Date of Patent: Jun. 7, 2011

(54) IMAGE PROCESSING APPARATUS AND METHOD

(75) Inventor: Weiguo Wu, Tokyo (JP)

(73) Assignee: Sony Corporation (JP)

( * ) Notice: Subject to any disclaimer, the term of this patent is extended or adjusted under 35 U.S.C. 154(b) by 813 days.

(21) Appl. No.: 10/996,521

(22) Filed: Nov. 24, 2004

(65) Prior Publication Data

US 2005/0129325 A1  Jun. 16, 2005

(30) Foreign Application Priority Data

Nov. 27, 2003  (JP) ................. 2003-398155

(51) Int. Cl.
*G06K 9/00* (2006.01)
*G06K 9/32* (2006.01)
*H04N 17/02* (2006.01)

(52) U.S. Cl. ............... 382/154; 382/294; 348/187

(58) Field of Classification Search .......... 382/154, 382/162–167, 254; 345/419; 348/187, 207.99
See application file for complete search history.

(56) References Cited

U.S. PATENT DOCUMENTS

| 5,867,591 | A  | * | 2/1999 | Onda ................... 382/154 |
| 6,011,863 | A  | * | 1/2000 | Roy .................... 382/154 |
| 6,519,358 | B1 | * | 2/2003 | Yokoyama et al. ........ 382/154 |
| 6,552,742 | B1 | * | 4/2003 | Seta ................... 348/42 |
| 6,597,807 | B1 | * | 7/2003 | Watkins et al. .......... 382/164 |
| 6,816,187 | B1 | * | 11/2004 | Iwai et al. ............ 348/187 |
| 6,985,175 | B2 | * | 1/2006 | Iwai et al. ............ 348/187 |
| 7,015,951 | B1 | * | 3/2006 | Yoshigahara et al. ... 348/207.99 |
| 7,065,245 | B2 | * | 6/2006 | Toda ................... 382/154 |
| 7,113,632 | B2 | * | 9/2006 | Lee et al. ............. 382/154 |

FOREIGN PATENT DOCUMENTS

| JP | 11-053549 A | 2/1999 |
| JP | 2000-215311 A | 8/2000 |
| JP | 2000-350239 A | 12/2000 |
| JP | 2001-052177 A | 2/2001 |
| JP | 2002-300602 A | 10/2002 |

OTHER PUBLICATIONS

Papadimitriou et al., Epipolar Line Estimation and Rectification for Stereo Image Pairs, 1996, IEEE Transaction of Image Processing, vol. 5, pp. 672-676.*

(Continued)

*Primary Examiner* — Vu Le
*Assistant Examiner* — Andrae S Allison
(74) *Attorney, Agent, or Firm* — Lerner, David, Littenberg, Krumholz & Mentlik, LLP

(57) ABSTRACT

Directions normal to images of an object captured by at least two cameras from different points of view are aligned with each other to form corrected object images, and a correspondence is determined between at least one pixel position on a horizontal line in one of the corrected object images and at least one pixel position on the same horizontal line in another of the corrected object images. The correspondence is determined by determining a similarity in brightness and color components at the pixel positions and a parallax between the corrected object images A robust, accurate image matching can be done by making dynamic matching between all pixels on a scan line in the images captured by the cameras.

14 Claims, 14 Drawing Sheets

OTHER PUBLICATIONS

Kano et al, Stereo Vision with Arbitrary Camera Arrangement and with Camera Calibration, Systems and Computers in Japan, vol. 29, No. 2, 1998.*

Zitnick, C. Lawrence and Webb, Jon A., "Multi-baseline Stereo Using Surface Extraction", Technical Report, CMU-CS-96-196, Nov. 24, 1996, pp. 1-29.

Okutomi, M. and Kanade, T., "A Locally Adaptive Window for Signal Matching", Int. Journal of Computer Vision, 7(2), 1992, pp. 143-162.

Okutomi, M. and Kanade, T., "A Multiple-Baseline Stereo", Journal of the Institute of Electronics, Information and Communication Engineers, D-II, vol. J75-D-II, No. 8, 1992, pp. 1317-1327.

Baker, H. and Binford, T., "Depth From Edge and Intensity Based Stereo", In Proc. IJCAI' 81, 1981, pp. 631-636.

Grimson, W.E.L., "Computational Experiments With a Feature-Based Stereo Algorithm", IEEE Trans PAMI, vol. 7, No. 1, 1985, pp. 17-34.

Poggio, Tomaso, Torre, Vincent & Koch, Christof, "Computational Vision and Regularization Theory", Nature, vol. 317, Sep. 26, 1985, pp. 314-319.

Miura, et al., A Dense Stereo Matching Method with Edge Adaptive Regularization, pp. 343-346, Proc (2002) IEICE General Congerence Information and Systems (2).

Yokomitsu, et al. Reconstruction of Real Outdoor Environmental Structures Using Multiple Stereo Images, technical Report of IEICE, PRMU98-250 (Mar. 1999), pp. 65-74.

* cited by examiner

NORMALIZED IMAGE Pm1      NORMALIZED IMAGE Pm2

IMAGE PROCESSING APPARATUS AND METHOD

CROSS-REFERENCE TO RELATED APPLICATIONS

The present invention claims priority from Japanese Application No. 2003-398155 filed Nov. 27, 2003, the disclosure of which is hereby incorporated by reference herein.

BACKGROUND OF THE INVENTION

The present invention relates to an imaging device, method and system applicable to a video conference system, visual telephone system or the like, for example, to capture an image which is to be sent and reconstruct it into a virtual viewpoint image which would result from imaging by a virtual camera.

There has been proposed a system by which a plurality of users at remote sites can have a remote conversational interaction between them while viewing each other's displayed image, such as a video conference system, visual telephone system or the like. In such a system, while a display unit at one of the remote sites is displaying an image of the user at the other site, the user viewing the image on the display unit is imaged as an object and image signals thus acquired are sent to the image processor at the other site via a network such as a public telephone network, private line or the like. Thus, the system can provide such a sense of realism as will make both the users at the remote sites feel as if they were talking with each other in the same place.

In the conventional video conference system, since the user viewing the image of his or her partner at the other site, being displayed nearly at the center of the display unit, is imaged by a camera positioned at the upper portion of the display unit, the image of the user keeping his head down will be displayed on the display unit at the other site. Therefore, the users will have a dialogue with no eye contact between them while actually viewing their respective display units, which will cause the users to feel something is wrong.

The camera ideally should be positioned nearly at the center of the display screen on which the image of the user at the other site is displayed, which will implement a dialogue between the users with eye contact between them. However, it is physically difficult to position the camera nearly at the center of the display screen.

To solve problems such as a dialogue with no eye contact between the users, there has been proposed an image processor which extracts three-dimensional information on an object on the basis of an input image captured by a plurality of cameras positioned at either side of the display unit at one of the remote sites, reconstructs an output image of the object according to the extracted three-dimensional information and information on the positions of users' viewpoints, and displays the reconstructed image on the display unit at the other user site (cf. Japanese Patent Application Laid Open No. 2001-521770). In this image processor, an epi-polar planar image generated from images captured by the plurality of cameras positioned in a line is used to synthesize a virtual viewpoint image assumed to have been captured by a camera not actually provided at the center of the display screen, to thereby implement highly realistic communications between the users with eye contact between them.

Also, there has been proposed an image processor which generates three-dimensional position information on the basis on images captured by two cameras positioned to the right and left, respectively, of the display unit in order to provide mutual eye contact between participants in a video conference (cf. Japanese Patent Application Laid Open No. 2002-300602).

Note here that for reconstructing an output image of an object as above, matching is determined per pixel position between images of the object captured by at least two cameras from different points of view. Thus, it is possible to determine the shape of the object and distance of the object to each of the cameras on the basis of the theory of triangulation and, hence, accurately generate a virtual viewpoint image captured by a virtual camera assumed to be positioned nearly at the center of the display screen.

Referring now to FIG. 1, there is explained a stereoscopic matching between images captured by two cameras positioned to the right and left, respectively, of a display unit in a basic configuration of the imaging system.

As shown, when an object is imaged by two cameras from different points of view, namely, optical centers C1 and C2 of the cameras, with the optical axes of the cameras being aligned with an M point, images Ps1 and Ps2 thus generated will be parallel to the image planes of the cameras. Straight lines connecting the cameras and M point coincide with directions of lines normal to the images Ps1 and Ps2, respectively, captured by the cameras, but the cameras and straight lines are different in direction from each other.

Note here that the images are matched to each other by extracting, from the images Ps1 and Ps2, pixel positions and brightness components at the same portion of the object P. For example, a point corresponding to a pixel m1 on an epi-polar line L1 on the image Ps1 will exist on an epi-polar line L1' on the image Ps2. By making a search on the epi-polar line L1', it is possible to detect an image m1' most similar to the pixel m1 as the corresponding point. Also, the pixels m1 and m1' thus matched to each other can be used to easily estimate the object P in a three-dimensional space.

The matching techniques having so far been proposed include pixel-based matching, area-based matching, feature-based matching, etc. Pixel-based matching searches one of the images for a point corresponding to a pixel in the other image (cf. C. Lawrence Zitnick and Jon A. Webb, "Multi-Baseline Stereo Using Surface Extraction" Technical Report, CMU-CS-96-196, 1996). Area-based matching matches a point corresponding to a pixel in one image with a point in another image while referring to a location image pattern around each corresponding point (cf. Okutomi M. and Kanade T., "A Locally Adaptive Window for Signal Matching", Int. Journal of Computer Vision, 7 (2), pp. 143-162, 1992, and Okutomi M. and Kanade T., "Stereo-matching Using a Plurality of Baseline Lengths", Journal of the Institute of Electronics, Information and Communication Engineers, D-II, Vol. J75-D-II, No. 8, pp. 1317-1327, 1992). Also, feature-based matching extracts dark and light edges from an image and matches images with each other referring only to features of the images (cf. H. Baker and T. Binford, "Depth from Edge and Intensity Based Stereo", In Proc. IJCAI' 81, 1981, and W. E. L. Grimson, "Computational Experiments with a Feature-Based Stereo Algorithm", IEEE Trans. PAMI, Vol. 7, No. 1, pp. 17-34, 1985).

SUMMARY OF THE INVENTION

It is therefore an object of the present invention to overcome the above-mentioned drawbacks of the related art by providing an image processing apparatus and method capable of robust, accurate matching of images by making dynamic matching between all pixels on a scan line in images captured by cameras.

The above object can be attained by providing an image processing apparatus and method in which directions normal to images of an object captured by at least two cameras from different points of view are aligned with each other to form at least two corrected object images and a correspondence is determined between at least one pixel position on a horizontal line in one of the corrected object images and at least one pixel position on the same horizontal line in another one of the corrected object images by determining a similarity in a brightness component and a color component at the pixel positions and a parallax between the corrected object images.

Namely, the image processing apparatus according to the present invention includes an image correcting unit operable to align object images acquired by imaging an object by at least two cameras from different points of view to thereby form at least two corrected object images, the corrected object images each including a plurality of horizontal lines and a plurality of pixels on each of the horizontal lines; and a matching unit operable to determine a correspondence between at least one pixel position on a horizontal line in one of the corrected object images and at least one pixel position on the same horizontal line in another of the corrected object images by determining a similarity in a brightness component and a color component at the pixel positions and a parallax between the corrected object images.

Also, the image processing method according to the present invention includes aligning object images acquired by imaging an object by at least two cameras from different points of view to thereby form at least two corrected object images, the corrected object images each including a plurality of horizontal lines and a plurality of pixels on each of the horizontal lines; and determining a correspondence between at least one pixel position on a horizontal line on one of the corrected object images and at least one pixel position on the same horizontal line in another one of the corrected object images by determining a similarity in a brightness component and a color component at the pixel positions and a parallax between the corrected object images.

With the image processing apparatus and method according to the present invention, even if an occlusion region exists, it is possible to make a more accurate matching, and to match repetition patterns of both eye portions, for example, or non-feature points (wall portions, for example) where the brightness will little vary with an improved accuracy.

These objects and other objects, features and advantages of the present invention will become more apparent from the following detailed description of the preferred embodiments of the present invention when taken in conjunction with the accompanying drawings.

DETAILED DESCRIPTION

The present invention will be described in detail below concerning the preferred embodiments thereof with reference to the accompanying drawings.

Figure 1:
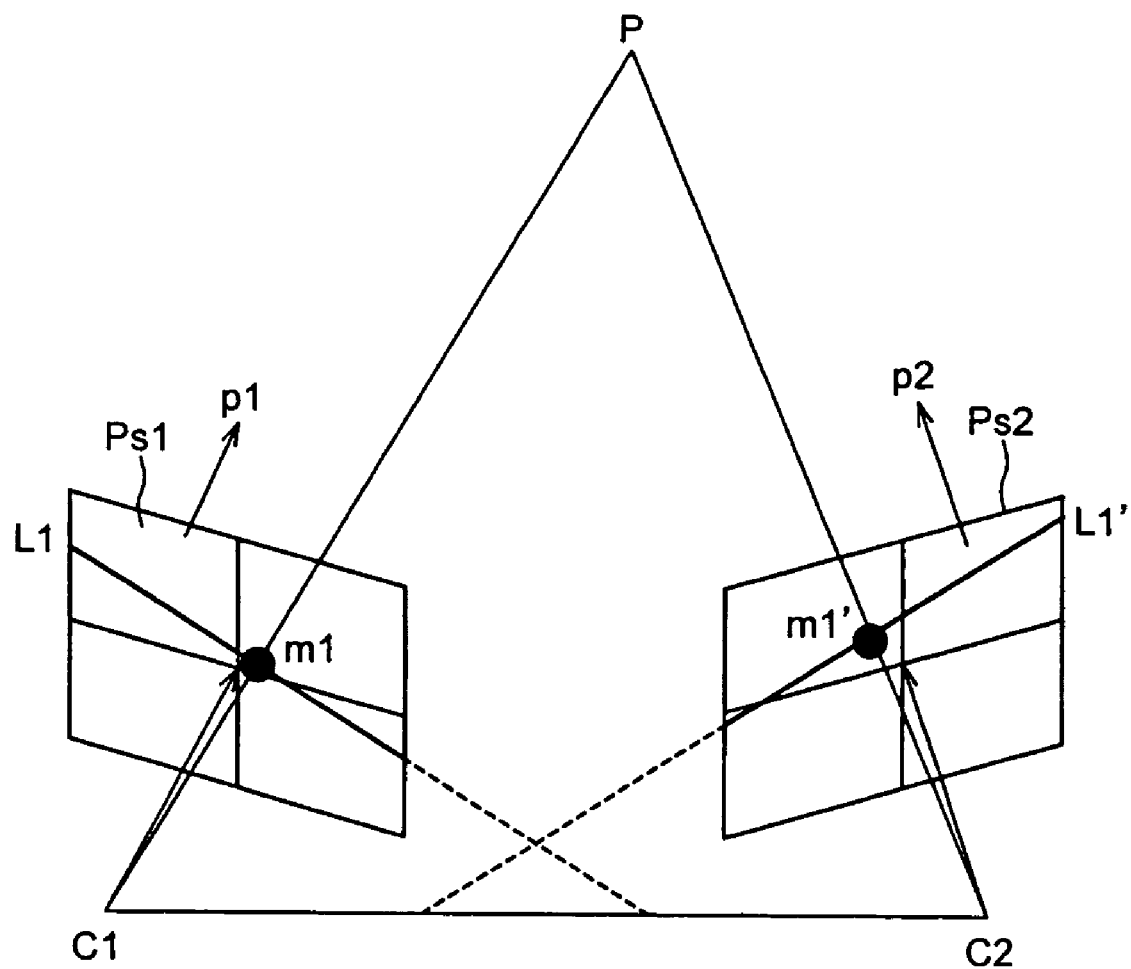
FIG. 1 explains stereoscopic matching between images captured by two cameras positioned to the right and left, respectively, of a display unit.
Figure 2:
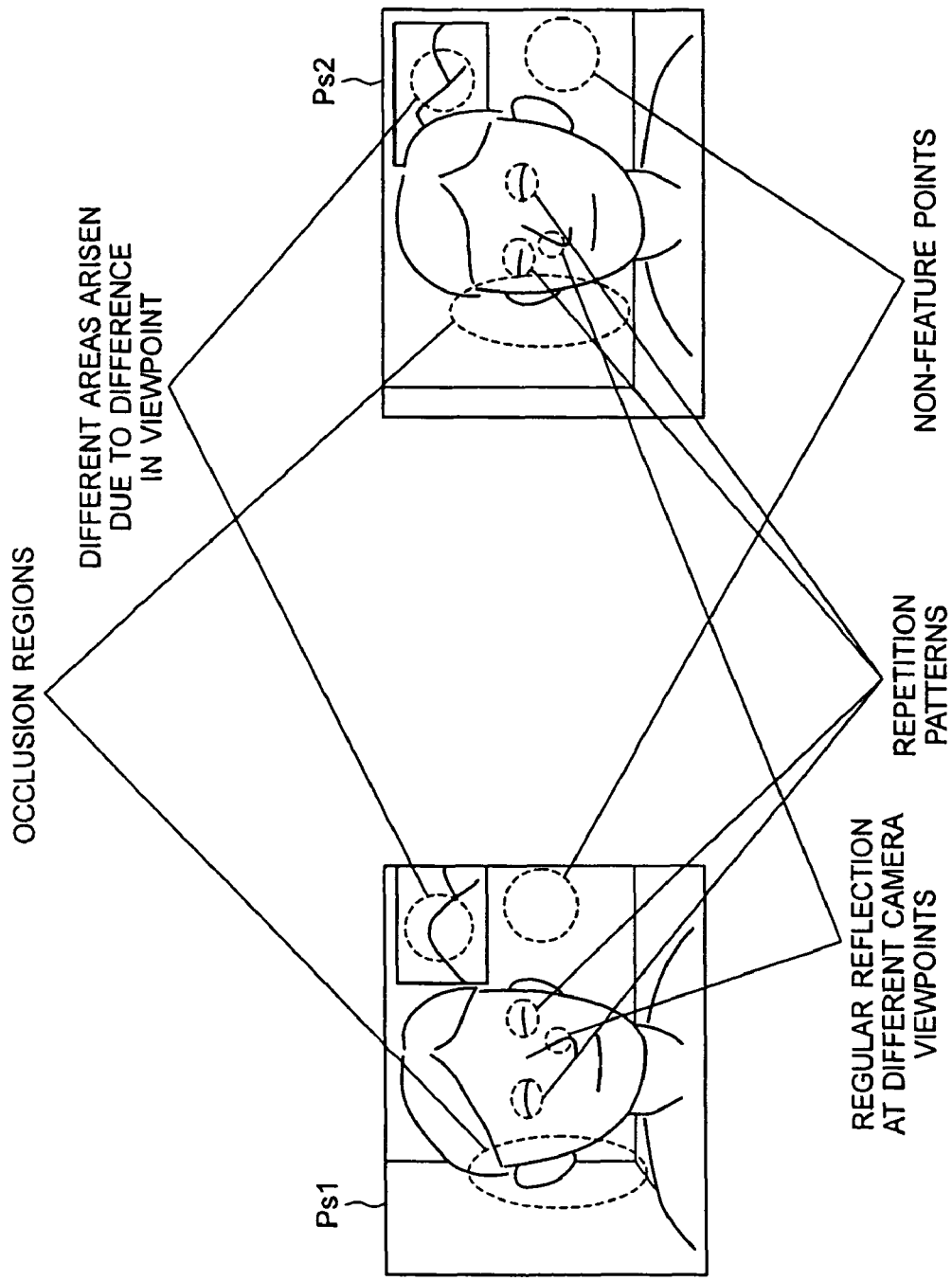
FIG. 2 explains the problems of the related art.
Figure 3:
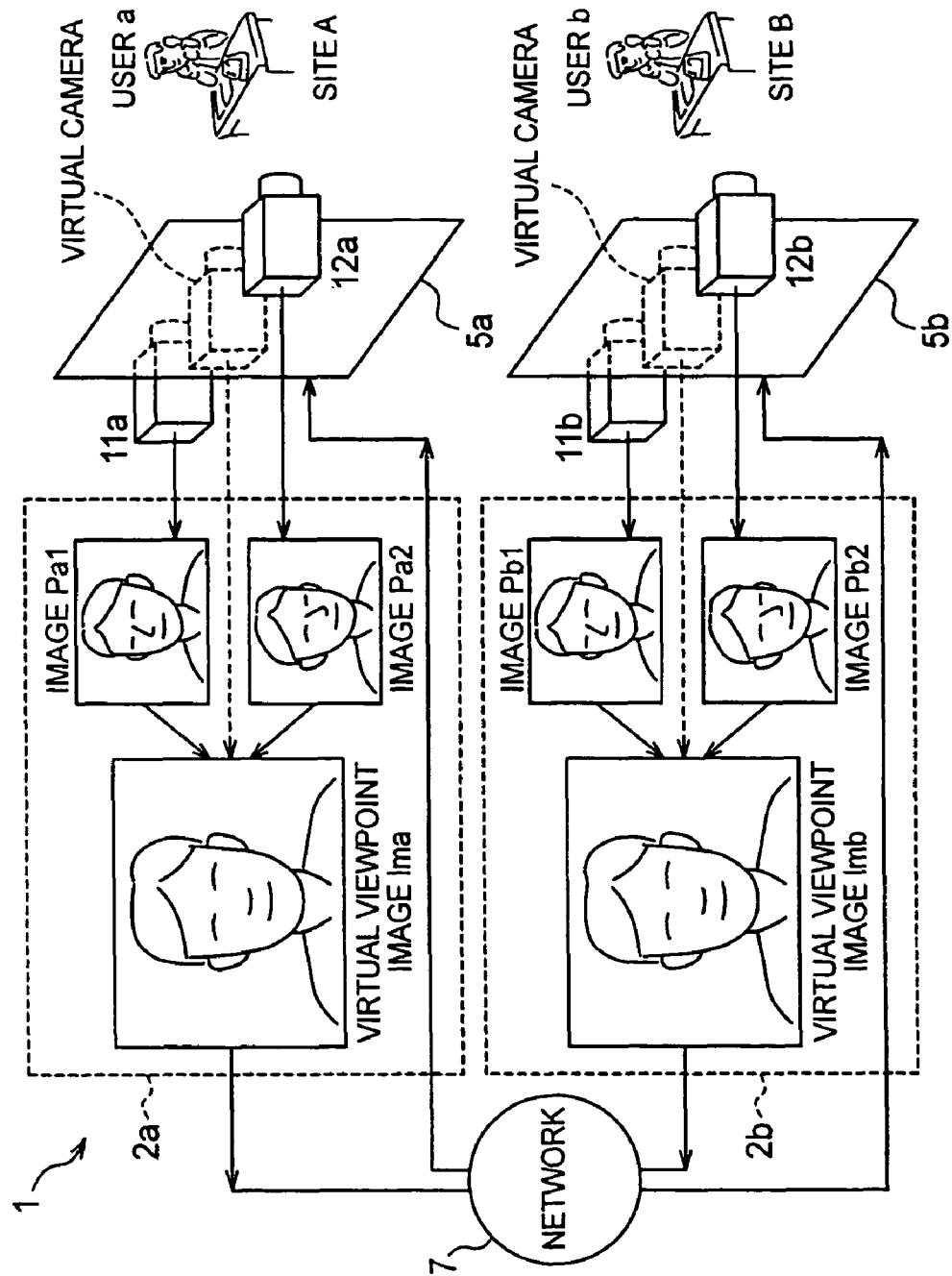
FIG. 3 schematically illustrates the communication system according to the present invention.

Referring now to FIG. 3, there is schematically illustrated a communication system according to the present invention. The communication system, generally indicated with a reference 1, permits a user a at a site A and a user b at a site B to have a remote dialogue between them while viewing each other's image at their respective sites.

As shown, at the site A, there are provided cameras 11a and 12a to image the user a as an object from different points of view, a display unit 5a to display an image of the user b, captured at the site B, to the user a, and an image processor 2a which generates a virtual viewpoint image Ima on the basis of images Pa1 and Pa2 captured by the cameras 11a and 12a and sends the image Ima to the site B via a network 7.

Also as shown, at the site B, there are provided cameras 11b and 12b to image the user b as an object from different points of view, a display unit 5b to display an image of the user a, captured at the site A, to the user b, and an image processor 2b which generates a virtual viewpoint image Imb on the basis of images Pb1 and Pb2 captured by the cameras 11b and 12b and sends the image Imb to the site A via the network 7.

The virtual viewpoint images Ima and Imb thus generated by the image processors 2a and 2b are equivalent to images virtual cameras disposed nearly at the centers, respectively, of the display units 5a and 5b on which the images of the user's partners are displayed, respectively.

The cameras 11a and 11b are positioned to the left of the display units 5a and 5b, respectively, in view of the users a and b, respectively, while the cameras 12a and 12b are positioned to the right of the display units, respectively, in view of the users a and b, respectively. Each of the cameras 11 and 12 is positioned to have a fixed direction and angle of view. Also, the direction and angle of view may freely be changed based on information entered by each of the users a and b. It should be noted that the communication system 1 will be explained concerning imaging of an object (user) by two cameras positioned in alignment with the eyeshot of the user.

Each of the display units 5a and 5b is supplied with the virtual viewpoint images Imb and Ima from the other user site via the network 7 and displays an image based on the virtual viewpoint image on a liquid crystal display screen thereof (will be referred to as an "LCD screen" hereafter). The LCD screen of each of the display units 5a and 5b is formed from a number of LCD elements or the like and forms an image to be viewed by the user by optically modulating the LCD elements correspondingly to output a signal based on each of the virtual viewpoint images Imb and Ima.

Normally, each of the image processors 2a and 2b includes an electronic device such as a personal computer (PC) or the like. Each of the image processors 2a and 2b has a function to communicate with the other via the network 7, and to send an image and sound upon request from the user at the other site. It should be noted here that each of the image processors 2a and 2b is constructed as will be described in detail later.

The network 7 is, for example, an Internet network connected to the image processor 2 via a telephone line or a public telephone network capable of two-way information communications, such as an ISDN (Integrated Services Digital Network) or B (broadband)—ISDN connected to a TA/modem. It should be noted here that in case the communication system 1 is used within a certain narrow area, the network 7 may be formed as a LAN (local area network). Further, in case the network 7 is to transmit moving pictures, the moving pictures including MPEG (Moving Pictures Experts Group) data, for example, are successively sent from one channel on the basis of the Internet protocol (IP). Also, in case still pictures are to be transmitted over the network 7, they will be sent at regular time intervals from a channel other than the channel on which moving pictures are transmitted. It should be noted that a network server (not shown) may be connected to the network 7. The network server (not shown) manages Internet information and sends predetermined information stored therein upon request from the image processor 2, for example.

Figure 4:
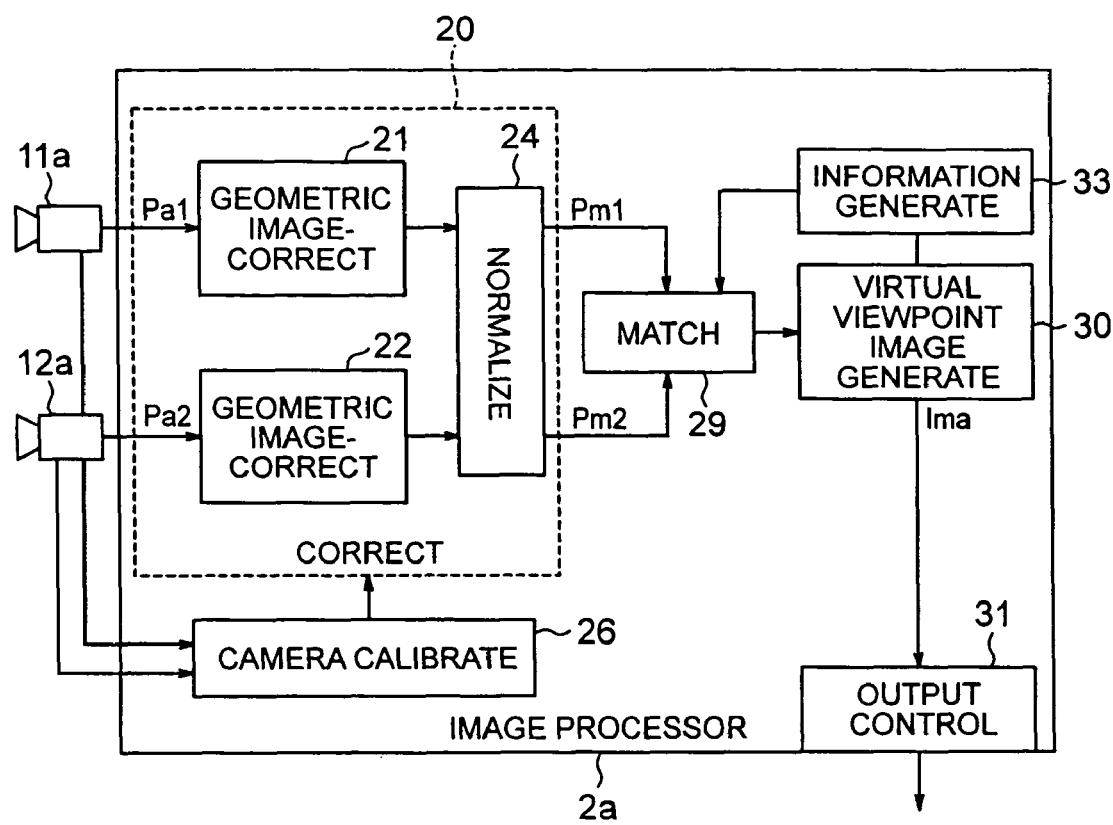
FIG. 4 explains the construction of an image processor in the communication system in FIG. 3.

Next, the configuration of the image processor 2 will be explained taking the image processor 2a as an example. As shown in FIG. 4, the image processor 2a includes a correction unit 20 which is supplied with the images Pa1 and Pa2 from the cameras 11a and 12a connected thereto, a matching unit 29 connected to the correction unit 20, a virtual viewpoint image generator 30 connected to the matching unit 29, an output controller 31 to send the virtual viewpoint image Ima generated by the virtual viewpoint image generator 30 to the image processor (terminal unit) 2b at the other user site, and an information generator 33 to generate relative-position information indicative of a positional relationship of the user a to each of the cameras 11a and 12b.

The correction unit 20 includes geometric image-correction portions 21 and 22 to make geometric image correction of images Pa1 and Pa2 sent from the cameras 11a and 12a, respectively, and a normalization portion 24 to normalize the images corrected by the geometric image-correction portions 21 and 22, respectively.

The geometric image-correction portions 21 and 22 correct the images Pa1 and Pa2 on the basis of control information, including the positional relationship of the cameras 11a and 12a to the user a, sent from a camera calibration unit 26. The positional relationship of the cameras 11a and 12a to the user a may be parameters in the control information sent from the camera calibration unit 26. In case the imaging direction and/or angle of view of each of the cameras 11a and 12a are changed for imaging the object, they may be parameterized by the camera calibration unit 26 and included in the control information. Thus, the geometric image-correction portions 21 and 22 can make real-time correction of the images Pa1 and Pa2 corresponding to the imaging direction and/or angle of view of the cameras 11a and 12a.

Note that the above camera calibration unit 26 may be adapted to parameterize a chromatic aberration, distortion and optical-axial misalignment of the lens of each of the cameras 11a and 12a with the camera calibration technique disclosed in Japanese Patent Application Laid Open Nos. 2000-350239 and 53549 of 1999 and send the parameters to each correction unit 20. In such a case, the correction unit 20 will match images from the cameras 11a and 12a with a reference image by making a projective transformation of them on the basis of the supplied parameters. Similarly, the camera calibration unit 26 will adjust the images from the cameras 11a and 12a in relation to each other concerning their brightness components and the like by the use of such projective transformation matrices as will minimize the difference in brightness between the images.

The normalization portion 24 is supplied with images corrected by the geometric image-correction portions 21 and 22 and makes a geometric normalization of the images. The normalization portion 24 aligns the normal-line directions of the images Pa1 and Pa2 captured by the cameras. More specifically, the normalization portion 24 normalizes the images Pa1 and Pa2 by aligning their normal lines with a normal-line direction set in a virtual plane π, and generates normalized images Pm1 and Pm2. In this case, the normalization portion 24 determines projective transformation matrices intended for projection of the images Pa1 and Pa2 captured by the cameras 11a and 12a onto the virtual plane π, and aligns the normal-line directions of the images with the normal-line direction in the virtual plane π on the basis of the projective transformation matrices thus determined.

Note here that in case each of the cameras 11a and 12a is a so-called fixed viewpoint camera, the normal-line directions of the images Pa1 and Pa2 may be acquired by the camera calibration unit 26 in advance. Also, in case imaging is to be done with the imaging direction and/or angle of view of the cameras 11a and 12a being changed, the imaging direction and angle of view may be parameterized by the camera calibration unit 26 and these parameters may be included in control information for normalization of the images. Thus, it is possible to flexibly cope with imaging with the imaging direction, etc. being sequentially changed in correspondence with the positions of the users a and b.

Also, with such parameters being stored in a ROM or RAM (not shown) in the camera calibration unit 26, the correction unit 20 can refer to the parameters at any time wherever and whenever necessary, to thereby implement a rapid correction. Also, the camera calibration unit 26 can make a highly accurate correction in each of the geometric image-correction portions 21 and 22 by determining the parameters for each of the images Pa1 and Pa2 supplied from the cameras 11a and 12a.

The matching unit 29 is supplied with the normalized images Pm1 and Pm2 generated by the normalization portion 24 to determine a positional matching between pixels included in the normalized images Pm1 and Pm2.

Figure 5:
FIG. 5 explains how to normalize images matched between them in a matching unit.
Figure 5:

Note here that the above positional matching between the pixels of the normalized images Pm1 and Pm2 is determined by extracting, from the images Pm1 and Pm2, the positions and brightness of the pixels forming the face of the user a and located in the same positions. As shown in FIG. 5, for example, a point corresponding to a pixel P11 on an epi-polar line L1 in the normalized image Pm1 will exist on an epi-polar line L1' in the normalized image Pm2. By making a search on the epi-polar line L1', it is possible to detect the position of a most similar pixel P11'. It should be noted that the matching unit 29 may be adapted to make a match only between points where features have been extracted or among all pixels included in the normalized images Pm1 and Pm2.

The information generator 33 generates information necessary for determining a positional match between the normalized images for every pixel, and supplies the information to the matching unit 29. Also, the information generator 33 may be adapted to determine the distance from each of the cameras 11a and 12a to the user a as an object and to generate parallax information based on the distances to produce the relative-position information. Such distance may be determined by acquiring depth information from image information generated by the cameras 11a and 12a.

Also, the information generator 33 may generate the relative-position information on the basis of a direction in which the user a is viewing the display unit 5a. In such a case, the information generator 33 acquires the line of vision of the user a from the images Pa1 and Pa2 supplied from the cameras 11a and 12a, and generates the relative-position information on the basis of the line of vision. Thus, it is possible to make an operation similar to that which is done by aligning the imaging direction of the virtual camera with the line of vision of the user a.

The virtual viewpoint image generator 30 is supplied with the matched pixel positions and brightness components of the pixels from the matching unit 29. Also, the virtual viewpoint image generator 30 determines, according to the relative-position information generated by the information generator 33, the pixel positions and brightness components of the pixels included in a new virtual viewpoint image Ima to be produced. The virtual viewpoint image generator 30 supplies the virtual viewpoint image Ima formed from the determined pixel positions and brightness components to the output controller 31.

The output controller 31 controls the sending of the virtual viewpoint image Ima produced by the virtual viewpoint image generator 30 to the image processor 2b via the network 7. In such a case, the output controller 31 may be adapted to provide a control for sending solely the images Pa1 and Pa2 supplied from the cameras 11a and 12a to the image processor 2b.

The image processor 2a functions as will be described in detail below.

The user a as an object is imaged by the cameras 11a and 12a from different angles. Thus, the direction of viewing and face of the user a in the image Pa1 captured by the camera 11a will be different from those in the image Pa2 captured by the camera 12a. The images Pa1 and Pa2 are supplied to the geometric image-correction portions 21 and 22 where they will have distortion, decentering and the like thereof corrected based on parameters such as lens distortions of the cameras 11a and 12a and image centers, pre-determined by the camera calibration unit 26.

The images Pa1 and Pa2 corrected by these geometric image-correction portions 21 and 22 are supplied to the normalization portion 24 where they will be normalized as will be described below.

Figure 6:
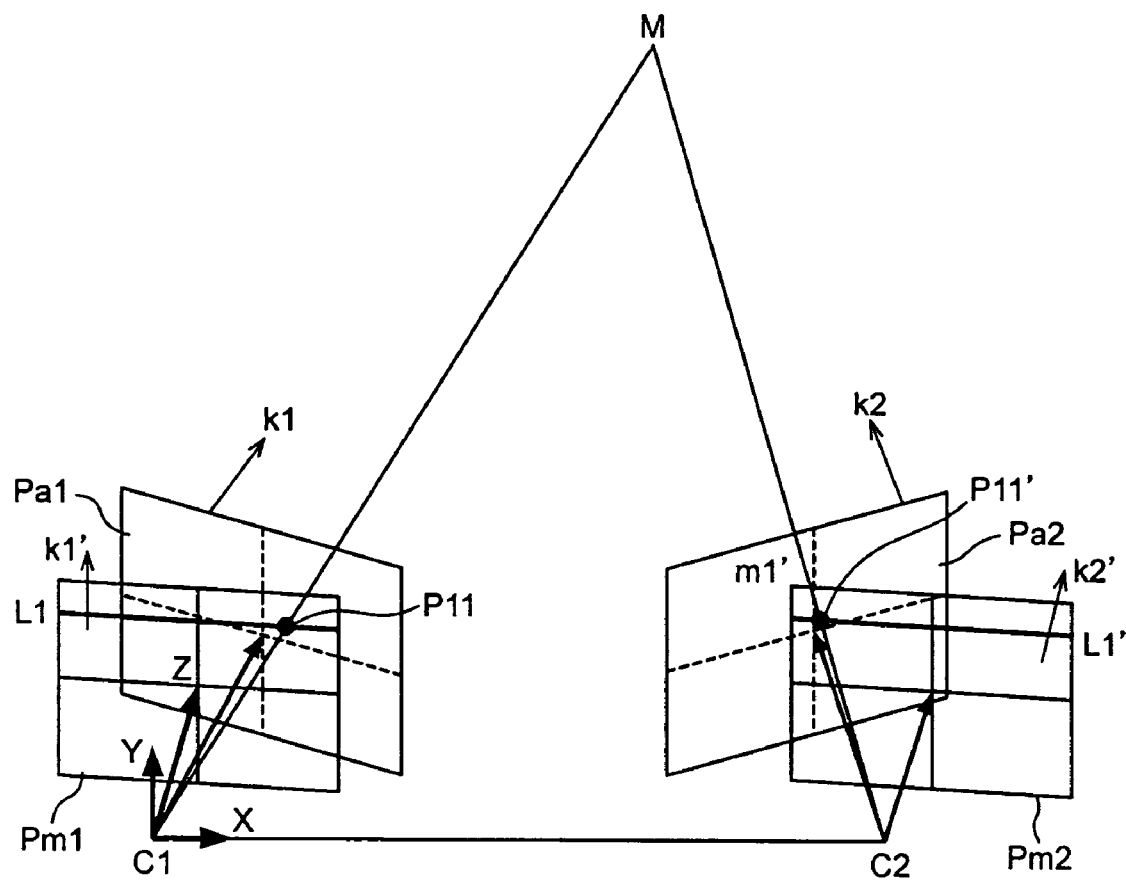
FIG. 6 explains how to normalize images Pa1 and Pa2 by aligning lines normal to the image, respectively.

FIG. 6 explains how to normalize the images Pa1 and Pa2 captured by the cameras 11a and 12a. As shown in FIG. 6, when the user a is imaged by the cameras 11a and 12a from different viewpoints with the optical axes through their respective optical centers C1 and C2 being aligned with a point M of the object (user a), images Pa1 and Pa2 thus captured by the cameras 11a and 12a, respectively, will be parallel to the imaging planes of the cameras 11a and 12a. The directions of straight lines connecting the cameras 11a and 12a and the point M to each other are coincident with normal-line directions k1 and k2 of the images Pa1 and Pa2 but different from each other. A geometric normalization is effected to parallelize the normal-line directions k1 and k2 of the images Pa1 and Pa2 with each other, thereby producing normalized images Pm1 and Pm2.

The above geometric normalization can be implemented by estimating intra-camera parameters A1 and A2, rotation matrices R1 and R2 and transition matrices T1 and T2 with the use of projective transformation matrices P1 and P2 pre-determined by the camera calibration unit 26. Thus, it is possible to produce images Pm1 and Pm2 normalized by parallelizing directions k1' and k2' of lines normal to the imaging planes of the normalized images.

Note here that the geometric normalization may be done using the projective transformation matrices P1 and P2 with a virtual plane π including the optical centers C1 and C2 having been set, so that the normal-line directions of the images Pa1 and Pa2 will be parallelized with the normal-line direction of the virtual plane π.

The matching unit 29 matches the normalized images Pm1 and Pm2 projective-transformed in the normalization portion 24 in association with the object per pixel position. In the present invention, since the images are pre-normalized in the normalization portion 24 provided before the matching unit 29 and have their epi-polar lines parallelized with each other, the robustness of the image search can be improved.

In case the normalized images Pm1 and Pm2 are matched in the matching unit 29, a point corresponding to the pixel P11 on the epi-polar line L1 in the normalized image Pm1 will exist on the epi-polar line L1' in the normalized image Pm2 as shown in FIG. 6. By making a search on the epi-polar line L1', a pixel P11' as a corresponding point can be detected.

Figure 7A:
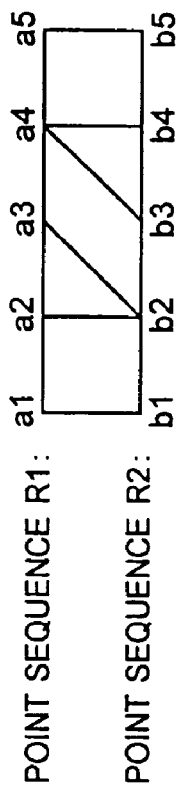
FIG. 7 explains DP-based matching.

As shown in FIG. 7A, for matching a pixel on the epi-polar line L1 in the normalized image Pm1 of the user a as the object with a pixel on the epi-polar line L1' in the normalized image Pm2, it is assumed that a feature point sequence R1 on the epi-polar line L1 includes a sequence of feature points a1, a2, a3, a4 and a5 and a feature point sequence R2 on the epi-polar line L1' includes a sequence of feature points b1, b2, b3, b4 and b5. When the feature point sequences R1 and R2 existing on the epi-polar lines L1 and L1', respectively, are matched with each other in relation to the object, the feature point b1 on the epi-polar line L1' will correspond to the feature point a1 on the epi-polar line L1 in a one-to-one relation while the feature points a2 and a3 forming an image of the right ear of the user a will correspond to the feature point b2 on the epi-polar line L1' in a two-to-one relation. Similarly, the feature point a4 forming an image of the left ear of the user a will correspond to the feature points b3 and b4 on the epi-polar line L1' in a one-to-two relation. It should be noted that the feature point a5 will correspond to the feature point b5 on the epi-polar line L1' in a one-to-one relation.

As above, the normalized images Pm1 and Pm2 resulting from the imaging of the user a from different viewpoints are different from each other in the display of the user's ear portion or the like because of the parallax caused by the difference in distance from the object to the cameras. An area such as the ear portion will be referred to as an "occlusion region" hereafter. Since in an occlusion region, a corresponding point in an object's image in one of the normalized images is masked by the other normalized image, the conventional matching of the feature points with one another, that is, matches (a1, b1), (a2, b2), (a3, b3), (a4, b4) and (a5, b5), will result in an error.

Figure 7B:
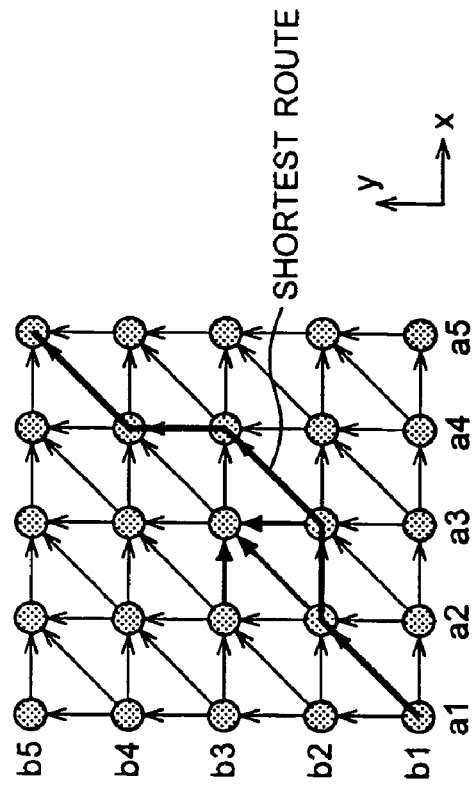

Therefore, the matching unit 29 of the image processor 2a according to the present invention is controlled to determine the above parallax for matching the feature point sequences R1 and R2 in the respective normalized images shown in FIG. 7A with each other to provide matches (a1, b1), (a2, b2), (a3, b2), (a4, b3), (a4, b4) and (a5, b5) as shown in FIG. 7B.

Figure 7C:
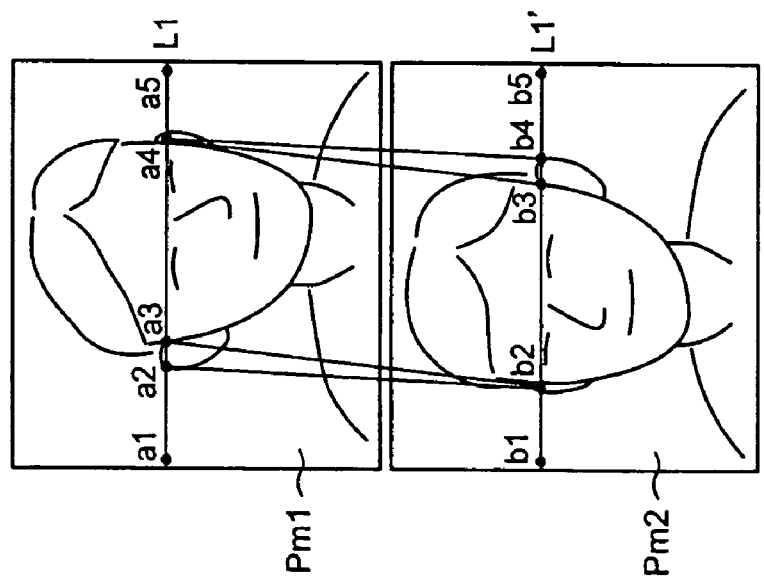

More specifically, all pixels on the epi-polar line in each of the normalized images Pm1 and Pm2 are dynamically matched with each other on the basis of a dynamic programming (DP) as shown in FIG. 7C.

In the case the relation of matching shown in FIG. 7B is applied to the graph shown in FIG. 7C with the sequence R1 of feature points a1, a2, a3, a4 and a5 on the epi-polar line L1 being laid on the x-axis in FIG. 7C while the sequence R2 of feature points b1, b2, b3, b4 and b5 on the epi-polar line L1' is laid on the y-axis, the search for a match will be made along a route indicated with a heavy line in FIG. 7C. The straight line connecting the corresponding points to each other and indicated with the heavy line will be referred to as an "optimum route" hereafter.

For a right-upward linear extension of the optimum route, corresponding feature points are sequentially shifted in a one-to-one relation until feature points matching each other are reached when shifting from the left to the right on each of the epi-polar lines L1 and L1'. In an example of a right-upward linear extension of the optimum route, a shift can be made one feature point after another from the left to right starting at feature points a1 and b1 on the respective epi-polar lines L1 and L1' to correctly match the feature points a2 and b2 with each other.

Also, for horizontal shifting along the optimum route, a parallax between the normalized images Pm1 and Pm2 suggests that a feature point in the normalized image Pm1 has been masked by the normalized image Pm2. In this case, a plurality of feature points in the normalized image Pm1 are matched with one feature point in the normalized image Pm2. In an example of a horizontal shifting along the optimum route, since one (b2) of the feature points a2 and b2 laid on the epi-polar lines L1 and L1', respectively, and forming the image of the right ear of the user a also corresponds to the feature point a3 because of the parallax, the feature point b2 is matched with the feature point a3 as well.

Also, for vertical shifting along the optimum route, a parallax between the normalized images Pm1 and Pm2 suggests that a feature point in the normalized image Pm1 has been masked by the normalized image Pm2. In this case, a plurality of feature points in the normalized image Pm2 are matched with one feature point in the normalized image Pm1. In an example of a vertical shifting along the optimum route, since one (a4) of the feature points a4 and b3 laid on the epi-polar lines L1 and L1', respectively, and forming the image of the right ear of the user a also corresponds to the feature point b4 because of the parallax, the feature point a4 is matched with the feature point b4 as well.

The matching unit 29 matches the feature points with each other between the epi-polar lines L1 and L1' forming all or a part of the pixels included in the normalized images Pm1 and Pm2, respectively. By determining the above-mentioned optimum route for each of the epi-polar lines L1 and L1', the matching unit 29 makes matches between the feature point sequences R1 and R2.

Figure 8:
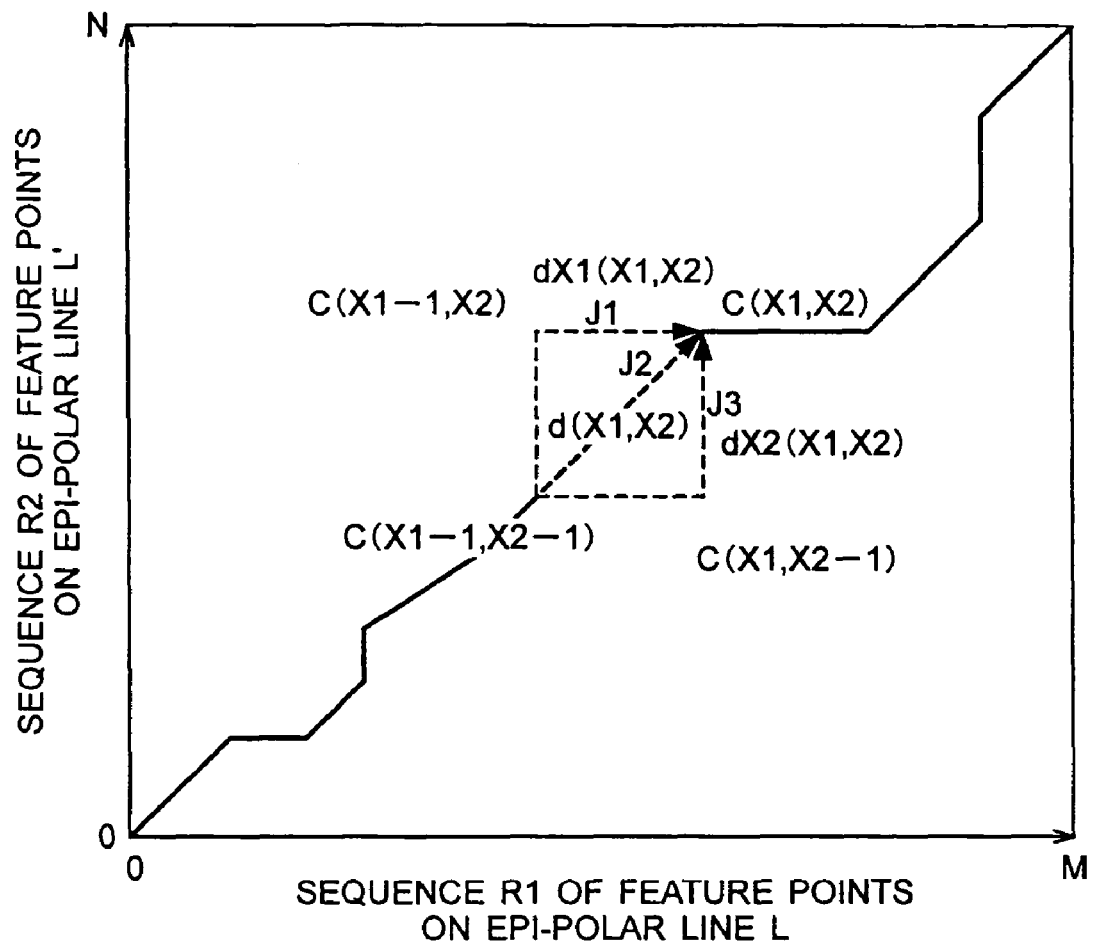
FIG. 8 shows how to determine an optimum route to an arbitrary feature point (x, y) on epi-polar lines L1 and L1'.

FIG. 8 shows how to determine the optimum route to arbitrary feature points $a_i(x1,y)$ and $b_j(x2,y)$ on the epi-polar lines $1i$ and L1', where i=1, 2, ... M and j=1, 2, ... N.

The optimum route to the points C(X1,X2) is linearly extended to the upper right in the graph in FIG. 8 by shifting points each by one point from the left to the right starting at points C(X1-1, X2-1) or horizontally extends from feature points C(X1-1, X2) in the graph in FIG. 8 by shifting points horizontally by one point with the feature point X2 of the points C(X1-1, X2) being maintained without change. Further, the optimum route to the points C(X1, X2) will vertically extend from points C(X1, X2-1) in the graph in FIG. 8 by shifting points vertically by one point with the point X1 of the points C(X1, X2-1) being maintained without change.

More specifically, the optimum route to the points C(X1, X2) will pass by the point C(X1-1, X2), C(X1-1, X2-1) or C(X1, X2-1) positioned to the left, lower left or below same as shown in FIG. 8. According to the present invention, the matching unit 29 determines a route to the points C(X1, X2) via any of the points C(X1, X2), C(X1-1, X2-1) and C(X1, X2-1) by sequentially calculating the functions which will be described below.

The matching unit 29 calculates a matching cost function d(X1, X2) and dynamic occlusion cost functions dX1(X1, X2) and dX2(X1, X2), which will be given later, and determines the aforementioned optimum route corresponding to the functions thus calculated. The matching cost function d(X1, X2) indicates a similarity in brightness and color components between pixel positions whose correspondence is to be determined, the occlusion cost function d(X1, X2) indicates masking of the object image in the normalized image Pm1 by the normalized image Pm2, and the occlusion cost function dX2(X1, X2) indicates masking of the object image in the normalized image Pm2 by the normalized image Pm1. These occlusion cost functions dX1(X1, X2) and dX2(X1, X2) reflect parallax between the images of the object.

First, how to calculate the matching cost function d(X1, X2) will be described.

For the matching cost function d(X1, X2), it is determined which of the brightness and color components to be compared is to be weighted. This weighting is done by calculating the following equation (1) using a weighting factor $\alpha$:

$$d_k(s,t) = \alpha \times dY_k(s,t) + (1-\alpha)dC_k(s,t) \quad (1)$$

where (s, t) indicates positions of pixels in the normalized images Pm1 and Pm2 corresponding to the points (X1, X2), and k indicates lines in the normalized images Pm1 and Pm2 on which the pixels are located (that is, k=y).

The term $dY_k(s, t)$ in equation (1) indicates an absolute difference in brightness component at coordinates (s, k) and (t, k) between the normalized images Pm1 and Pm2, and is defined by the following equation (2):

$$dY_k(s,t) = |Y1(s,k) - Y2(t,k)| \quad (2)$$

Also, the term $dC_k(s, t)$ in equation (1) indicates an absolute difference in color component between the normalized images Pm1 and Pm2, and is defined by the following equation (3):

$$dC_k(s,t) = |C1(s,k) - C2(t,k)| \quad (3)$$

That is, by setting a larger value for the term $\alpha$ in equation (1), the term $d_k(s, t)$ to be determined can be allowed to reflect more on the absolute difference in brightness component $dY_k(s, t)$. Also, by setting a smaller value for the term a in equation (1), the term $d_k(s, t)$ to be determined can be allowed to reflect more on the absolute difference in color component $dC_k(s, t)$. It should be noted that the term a may be assigned a mean value to match the costs of the color and brightness components.

The term d(X1, X2) is determined by calculating the following equation (4) on the basis of the term $d_k(s, t)$ determined from equation (1):

$$d(X1,X2) = (\Sigma d_k(s,t))/2K \quad (4)$$

K=-K, ..., K-1

Equation (4) means that the term d(X1, X2) can be determined by averaging pixels positioned above and below the epi-polar line. The equation permits the term d(X1, X2) to reflect the correlation between the pixels above and below the epi-polar line. Thus, the matching can be done with a considerably improved accuracy.

Namely, the matching cost function d(X1, X2) determined as above will be larger with a larger absolute difference in brightness or color component in the pixel position (s, y) and (t, y) between the normalized images Pm1 and Pm2. In other words, the larger the difference in brightness or color component in the pixel position (s, y) and (t, y) between the normalized images Pm1 and Pm2, the larger will be the matching cost d(X1, X2). On the contrary, as the difference becomes smaller, the normalized images Pm1 and Pm2 will be more similar to each other, and the matching cost d(X1, X2) will become smaller. That is, the matching cost d(X1, X2) determines the similarity in brightness or color component in the pixel position (s, y) and (t, y) between the normalized images Pm1 and Pm2.

Next, there will be explained how to determine the occlusion cost functions dX1(X1, X2) and dX2(X1, X2).

Each of the occlusion cost functions dX1(X1, X2) and dX2/(X1, X2) is generated based on the parallax information generated by the information generator 33. As the distance from the cameras 11a and 12a to the user a as an object becomes shorter (the parallax becomes larger), the probability of the occlusion region occurring will be higher. The matching unit 29 addresses such a case by decreasing the values of the occlusion cost functions dX1(X1, X2) and dX2 (X1, X2). On the contrary, as the distance from the cameras 11a and 12a to the user a as the object becomes longer (the parallax becomes smaller), the probability of the occlusion region occurring will be lower. The matching unit 29 addresses this case by increasing the values of the occlusion cost functions dX1(X1, X2) and dX2(X1, X2).

The occlusion cost functions dX1(X1, X2) and dX2(X1, X2) can be determined based on the following equations (5) and (6):

$$dX1(X1,X2)=\beta \times d(X1,X2)+T0 \quad (5)$$

$$dX2(X1,X2)=\gamma \times d(X1,X2)+T1 \quad (6)$$

where the term d(X1, X2) is subject to the parallax information acquired as above, and becomes smaller as the parallax increases and becomes larger as the parallax decreases. The terms $\beta$ and $\gamma$ indicate rates of change of the term d(X1, X2) and can be predetermined with experiments. The terms T0 and T1 are initial occlusion cost constants and also can be predetermined with experiments.

After determining each of the above occlusion cost functions dX1(X1, X2), d(X1, X2) and dX2(X1, X2), the matching unit 29 adds cumulative matching costs C(X1-1, X2), C(X1-1, X2-1) and C(X1, X2-1) on the basis of the following equations (7), (8) and (9), respectively, to calculate total costs k1, k2 and k3:

$$k1=C(X1-1,X2)+dX1(X1,X2) \quad (7)$$

$$k2=C(X1-1,X2-1)+d(X1,X2) \quad (8)$$

$$k3=C(X1,X2-1)+dX2(X1,X2) \quad (9)$$

where the terms C(X1-1, X2), C(X1-1, X2-1) and C(X1, X2-1) indicate cumulative matching costs determined at the points (X1-1, X2), (X1-1, X2-1) and (X1, X2-1), respectively. It should be noted that a minimum one of the total costs k1, k2 and k3 is assigned to the cumulative matching cost C(X1, X2) at the point (X1, X2) as given by the following equation (10):

$$C(X1,X2)=\min\{k1,k2,k3\} \quad (10)$$

The matching unit 29 determines an optimum route by selecting the minimum one of the calculated total costs k1, k2 and k3.

If the total cost k1 is minimum, the parallax is larger, which means that the feature points in the normalized image Pm1 are masked by the normalized image Pm2. In such a case, an optimum route to the point (X1, X2) will be determined by horizontal shifting starting at the point (X1-1, X2) as indicated by arrow J1 in FIG. 8.

If the total cost k3 is minimum, the parallax is larger, which means that the feature points in the normalized image Pm2 are masked by the normalized image Pm1. In such a case, an optimum route to the point (X1, X2) will be determined by vertical shifting starting at the point (X1, X2-1) as indicated by arrow J3 in FIG. 8.

Further, when the total cost k2 is minimum, the normalized images Pm1 and Pm2 are highly similar in brightness or color component in the pixel position (s, y) and (t, y). In such a case, an optimum route to the feature point (X1, X2) will be determined by both vertical and horizontal shifting one feature point after another starting at the point (X1-1, X2-1) as indicated by arrow J2 in FIG. 8.

Figure 9A:
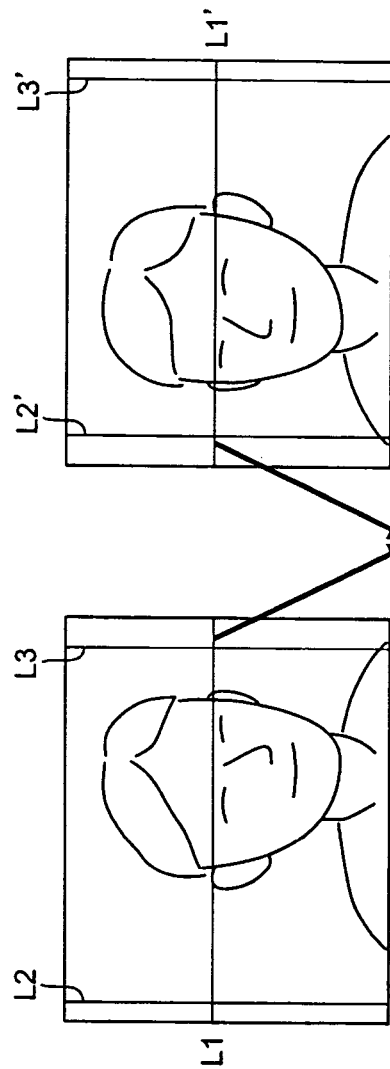
FIG. 9 shows the correspondence in a pixel component (brightness or color component) between feature points on the epi-polar lines L1 and L1' in normalized images Pm1 and Pm2, respectively.
Figure 9B:
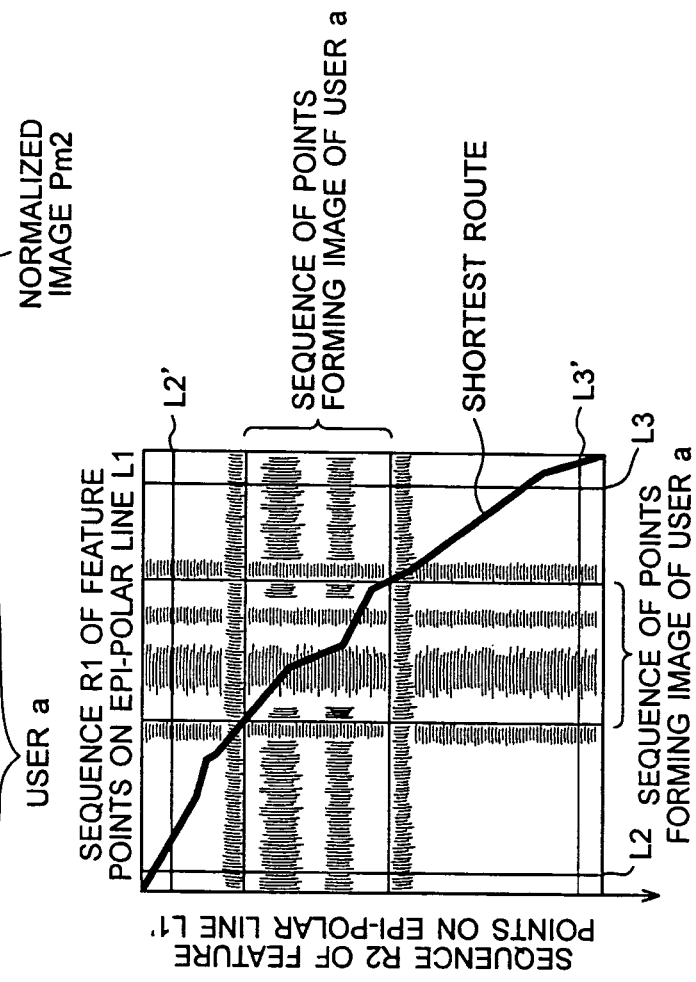

FIG. 9B shows the correspondence between pixel components (brightness or color) of feature points on the epi-polar lines L1 and L1' in the normalized images Pm1 and Pm2 in FIG. 9A.

Concavities L2 and L3 in the walls at both sides of the user a in the normalized image Pm1 in FIG. 9A, and concavities L2' and L3' in the walls at both sides of the user a in the normalized image Pm2, clearly appear in the form of a line as differences in the pixel components in FIG. 9B. Similarly, the pixel components forming the image of the user a definitely appear as differences in pixel components nearly in the center of FIG. 9B.

If an optimum route passes by the intersection of the same pixel components at feature points on the epi-polar lines L1 and L1' as in FIG. 9B, it means that the total cost k2 is minimum so that priority is given to a high similarity in the brightness or color component in the pixel position (s, t). On the other hand, if an optimum route passes by any point other than the intersection of the same pixel components at feature points on the epi-polar lines L1 and L1', it means that the total cost k1 or k3 is minimum so that either of the normalized images Pm1 and Pm2 is masked because of the parallax.

As above, an optimum route from any of the points (X1-1, X2), (X1-1, X2-1) and (X1, X2-1) to the point (X1, X2) will be determined. The determination of an optimum route means that an optimum correspondence has been determined correspondingly to the similarity in brightness and color components and parallax between the normalized images Pm1 and Pm2. Also, the term C(X1, X2) in the aforementioned equation (10) will be defined as an optimum cumulative matching cost for determining a correspondence in brightness or color component between pixels in each pixel position. Since cumulative referencing can be made to these cumulative matching costs C(X1, X2) in determining an optimum route to upper, upper-right and right feature points in the graph in FIG. 9, matching can be done with a higher accuracy.

Also, since the matching unit 29 calculates each of the functions dX1(X1, X2), d(X1, X2) and dX2(X1, X2) on the basis of a concept which is quite different from the conventional one, when the total costs k1, k2 and k3 determined as above are compared with one another on the basis of the aforementioned equation (10), errors will possibly arise correspondingly to the imaging environment and object. In such a case, the terms $\beta$, $\gamma$, T0 and T1 in the equations (5) and (6) can be pre-optimized corresponding to the imaging environment and object to eliminate the differences among the functions dX1(X1, X2), d(X1, X2) and dX2(X1, X2).

The matching unit 29 in the image processor 2a according to the present invention determines whether priority is to be given to a determined similarity or parallax when determining a correspondence between the normalized images Pm1 and Pm2. When priority is given to a similarity, the matching unit 29 matches the same pixel positions on the horizontal line with each other. When priority is given to a parallax, the matching unit 29 matches a plurality of pixel positions on the same horizontal line with a single pixel position. Thus, it is possible to achieve a more accurate matching even in the case an occlusion region exists. Also, by making a match with the aforementioned technique, it is possible to match repetition patterns of both eye portions, for example, or non-feature points (wall portions, for example) where the brightness varies little with an improved accuracy. Further, even in a region where the brightness varies depending upon a line of vision, such as the window portions, or a region where a regular reflection takes place, such as the nose portion of the user, for example, a relatively easy match can be made with less influence from differences in brightness and color components.

Note that the matching unit 29 in the image processor 2a according to the present invention can, of course, be effective as described above so long as the similarity and parallax have been determined and the correspondence between the normalized images Pm1 and Pm2 has been determined in correspondence with the determined similarity and parallax.

Figure 10:
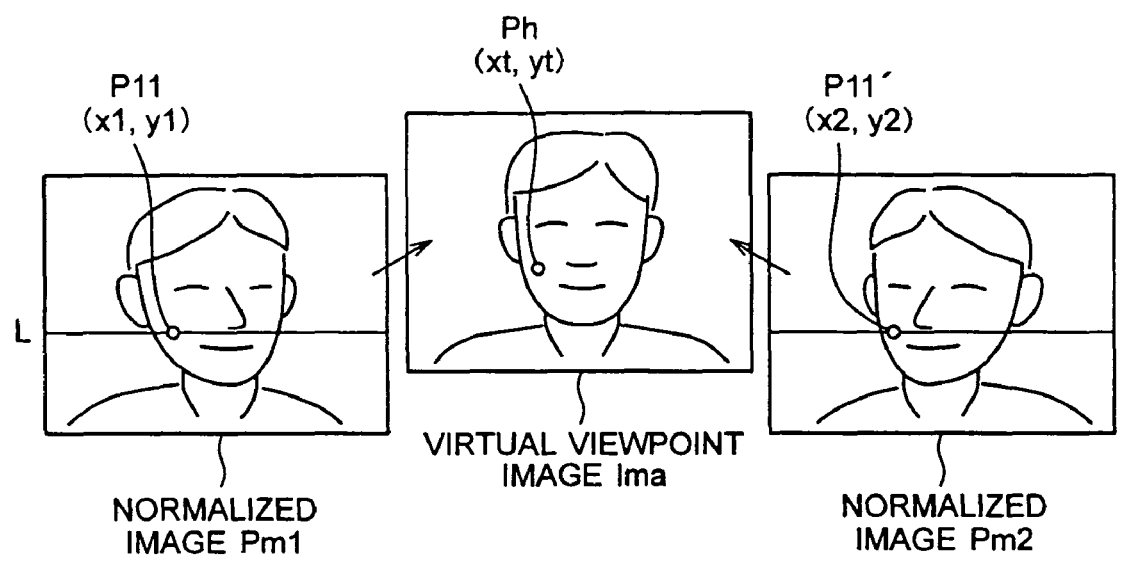
FIG. 10 explains how to generate a virtual viewpoint image.

The virtual viewpoint image generator 30 produces a virtual viewpoint image Ima on the basis of the correspondence determined by the matching unit 29 as described above. For example, if a pixel position P11' in the normalized image Pm2 has been determined as a point corresponding to a pixel position P11 in the normalized image Pm1 in the matching unit 29, the coordinates of such a pixel position P11 are taken as (x1, y1) and the coordinates of the pixel position P11' are taken as (x2, y2), as shown in FIG. 10. The virtual viewpoint image generator 30 can determine coordinates (xt, yt) of a pixel position Ph in the virtual viewpoint image Ima corresponding to such pixel positions P11 and P11', as given by the following equation (11) on the basis of relative-position information m:

$$(xt, yt) = (1-m) \times (x1, y1) + m \times (x2, y2) \quad (11)$$

Also, when the brightness components in the pixel positions P11 and P11' are taken as J11 and J11', respectively, the brightness component Pt in the pixel position Ph in such a virtual viewpoint image Ima is given by the following equation (12):

$$Pt = (1-m) \cdot J11 + m \times J11 \quad (12)$$

As described above, the virtual viewpoint image generator 30 can determine the coordinates of each of the pixels included in the virtual viewpoint image Ima and the brightness component in each pixel position corresponding to the relative-position information m. It should be noted that the relative-position information m becomes smaller as the virtual viewpoint of the virtual camera is nearer to the camera 11a while it becomes larger as that virtual viewpoint is nearer to the camera 12a.

Therefore, the coordinates (xt, yt) determined based on equation (11) are nearer to the coordinates (x1, y1) of the pixel position P11 as the virtual viewpoint is nearer to the camera 11a, while it will be nearer to the coordinates (x2, y2) of the pixel position P11' as the virtual viewpoint is nearer to the camera 12a. That is, since the coordinates (xt, yt) can be determined freely based on the position of the virtual camera, the user a can be displayed in a freely selected position in the virtual viewpoint image Ima.

Also, the brightness component Pt determined based on equation (12) is more approximate to the brightness component J11 in the pixel position P11 as the virtual viewpoint is nearer to the camera 11a, while it will be more approximate to the brightness component J11' in the pixel position P11' as the virtual viewpoint is nearer to the camera 12a. That is, pixels forming the image of the user a in the virtual viewpoint image Ima can be made to have a brightness component more approximate to the brightness component J11 or J11'.

More particularly, since the cameras 11a and 12a have different imaging directions from each other, the pixel position P11 in the normalized image Pm1 and the pixel position P11' in the normalized image Pm2, corresponding to the pixel position P11, are different from each other in brightness component. By linearly increasing or decreasing the brightness component Pt based on the relative-position information m on the assumption that one of the different brightness components is a minimum value and the other is a maximum value, it is possible to determine the brightness component of the pixels forming the image of the user a displayed in the virtual viewpoint image Ima with respect to the position of the virtual camera. Also, since the virtual viewpoint image Ima is produced based on the matching relationship established in the matching unit 29, it is possible to more effectively prevent an image thus formed from being degraded in image quality.

By sequentially determining the coordinates (xt, yt) of the pixel position Ph and the brightness component Pt in the pixel position, the virtual viewpoint image Ima produced will always be directed frontward in relation to the normalized images Pm1 and Pm2 in which the viewing directions, face directions, etc. of the user a are different from each other.

The virtual viewpoint image Ima produced as described above is sent to the network 7 under the control of the output controller 31. Then, the virtual viewpoint image Ima sent to the image processor 2b at the other user site will be displayed on the display unit 5b under the control of the image processor 2b. The user b will have a dialogue with the user a while viewing the latter in the virtual viewpoint image Ima displayed on the display unit 5b. Since the face and line of vision of the user a are directed frontward, the user b will feel as if he were viewing an image captured by a virtual camera located near the center of the screen. Similarly, the user a will have a dialogue with the user b while viewing the latter in the virtual viewpoint image Imb displayed on the display unit 5a. However, the user a will be able to view the user b facing frontward. That is, the communication system 1 can implement a visual communication system in which the users can have a more realistic remote dialogue between them while always looking at each other.

This communication system 1 is particularly advantageous in that the entire system is not complicated because it suffices to provide at least two cameras 11 and 12 at both sides, respectively, of the display unit 5 and it is unnecessary to extract three-dimensional information on the object. Also, the communication system 1 can provide an easy-to-use, inexpensive system because it does not need any special devices, such as a half mirror, hologram screen, projector or the like.

Figure 11:
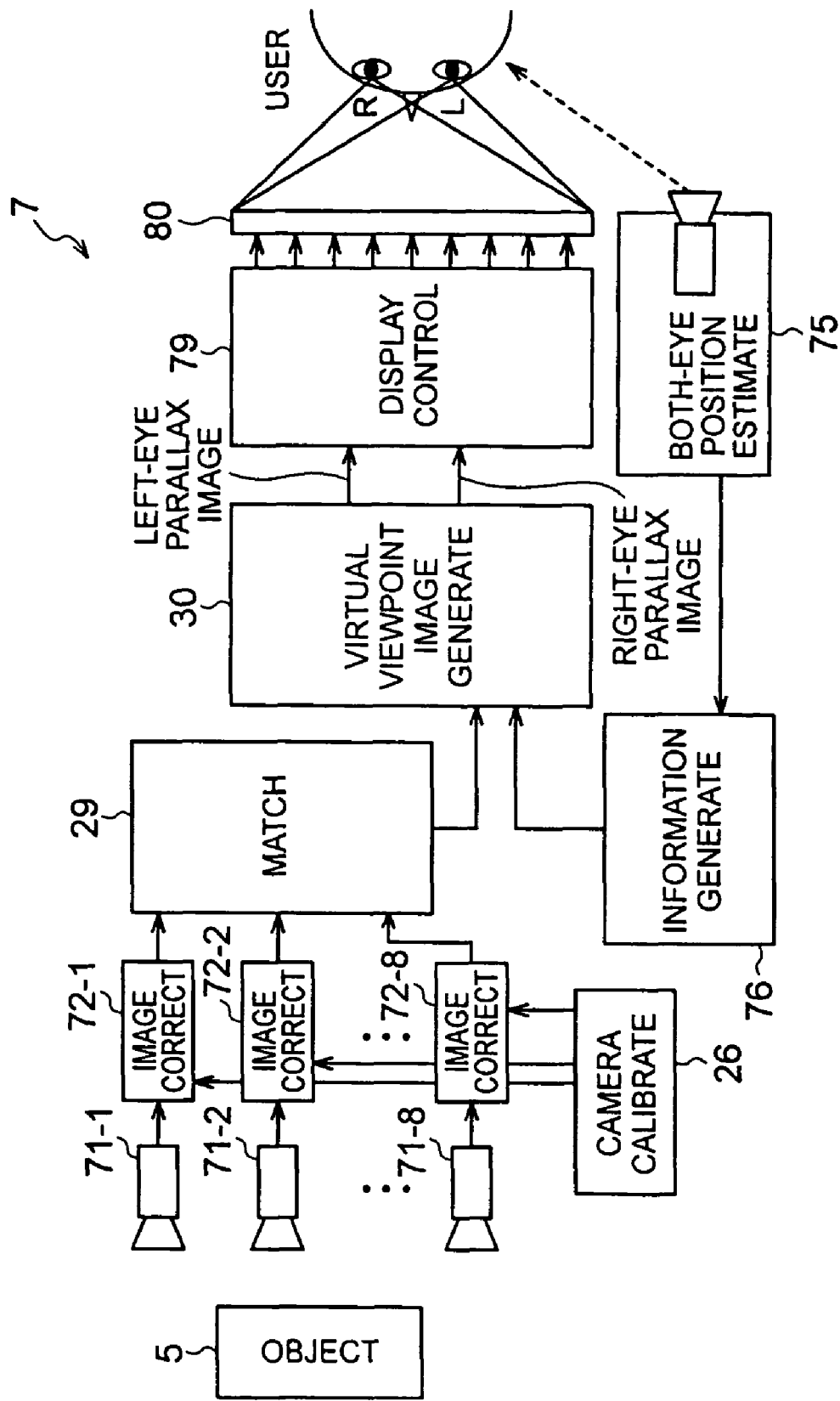
FIG. 11 shows the construction of an imaging system which generates a three-dimensional image.

Note that the communication system according to the present invention is not limited to the aforementioned embodiment, but also may be applied to an imaging system 7 which processes captured images for a compound-eye stereoscopic viewing as shown in FIG. 11, for example. The same or similar components in the imaging system 7 as those in the aforementioned communication system 1 are indicated with the same or similar reference numbers used to explain the communication system 1 and a further explanation of such components is omitted to avoid redundancy.

As shown in FIG. 11, the imaging system 7 includes eight cameras 71-1 to 71-8 to image the same object 5 from different points of view, image correction units 72-1 to 72-8 which are supplied with an image captured by each of the cameras 71-1 to 71-8, camera calibration unit 26 to supply necessary parameters for correcting the images in the image correction units 72-1 to 72-8, matching unit 29 to match images supplied from the image correction units 72-1 to 72-8 with each other, both-eye position estimation unit 75 to detect the position of the head of a user who views a stereoscopic display unit 80 and to estimate the relative viewpoint position of the user on the basis of the detected head position, information generator 76 to generate relative-position information indicative of a positional relationship of the user's viewpoint to the stereoscopic display unit 80 based on the user's viewpoint position estimated by the both-eye position estimation unit 75, virtual viewpoint image generator 30 connected to the matching unit 29 and the information generator 76 to generate a left-eye parallax image viewed by the user's left eye and a right-eye parallax image viewed by the user's right eye, and a display controller 79 which controls the stereoscopic display unit 80 to display the left-eye parallax image and the right-eye parallax image supplied from the virtual viewpoint image generator 30.

Each of the above cameras 71-1 to 71-8 supplies the captured optical image of the object to a CCD without change so as to convert the optical image into an electrical signal. The cameras 71-1 to 71-8 supply images represented by the converted electrical signals to the image correction units 72-1 to 72-8.

The image correction units 72-1 to 72-8 play the roles of the aforementioned geometric image correction units 21 and 22 to correct the input images on the basis of control information including the geometric relationship between the cameras 71-1 to 71-8.

The matching unit 29 matches the images captured by the adjacent cameras with each other in each pixel position of the object 5 as described above.

The both-eye position estimation unit 75 detects, relative to the stereoscopic display unit 80, the three-dimensional position and size of the head of the user viewing the stereoscopic display unit 80. The both-eye position estimation unit 75 uses a distance measuring apparatus or the like which makes a real-time position detection with a stereoscopic or range-finding technique. The both-eye position estimation unit 75 estimates the positions of the user's left and right eyes using three-dimensional space coordinates on the basis of the detected three-dimensional position and size of the user's head. The positions of both eyes may be estimated on a real-time basis while referring to statistical measured data on the positional relationship between a human head and both eyes, for example.

The information generator 76 generates relative-position information resulting from parameterization of the positions of the user's left and right eyes, estimated by the both-eye position estimation unit 75, and sends the information to the virtual viewpoint image generator 30.

The virtual viewpoint image generator 30 is supplied with pixel positions matched with each other by the matching unit 29 and brightness components in the pixel positions. Also, the virtual viewpoint image generator 30 generates left-eye and right-eye parallax images, in place of the virtual viewpoint image Ima, from the matched pixel positions and brightness components based on the relative-position information generated by the information generator 76.

The display controller 79 assigns a brightness level (RGB) in each pixel position to the left-eye and right-eye parallel images produced by the virtual viewpoint image generator 30 based on the display technique adopted in the stereoscopic display unit 80.

The stereoscopic display unit 80 is a combination of optical elements with a liquid crystal display panel to display left-eye and right-eye parallax images which are different from each other. It is advantageous in that the user can view a three-dimensional image without having to wear any special eyeglasses.

Figure 12A:
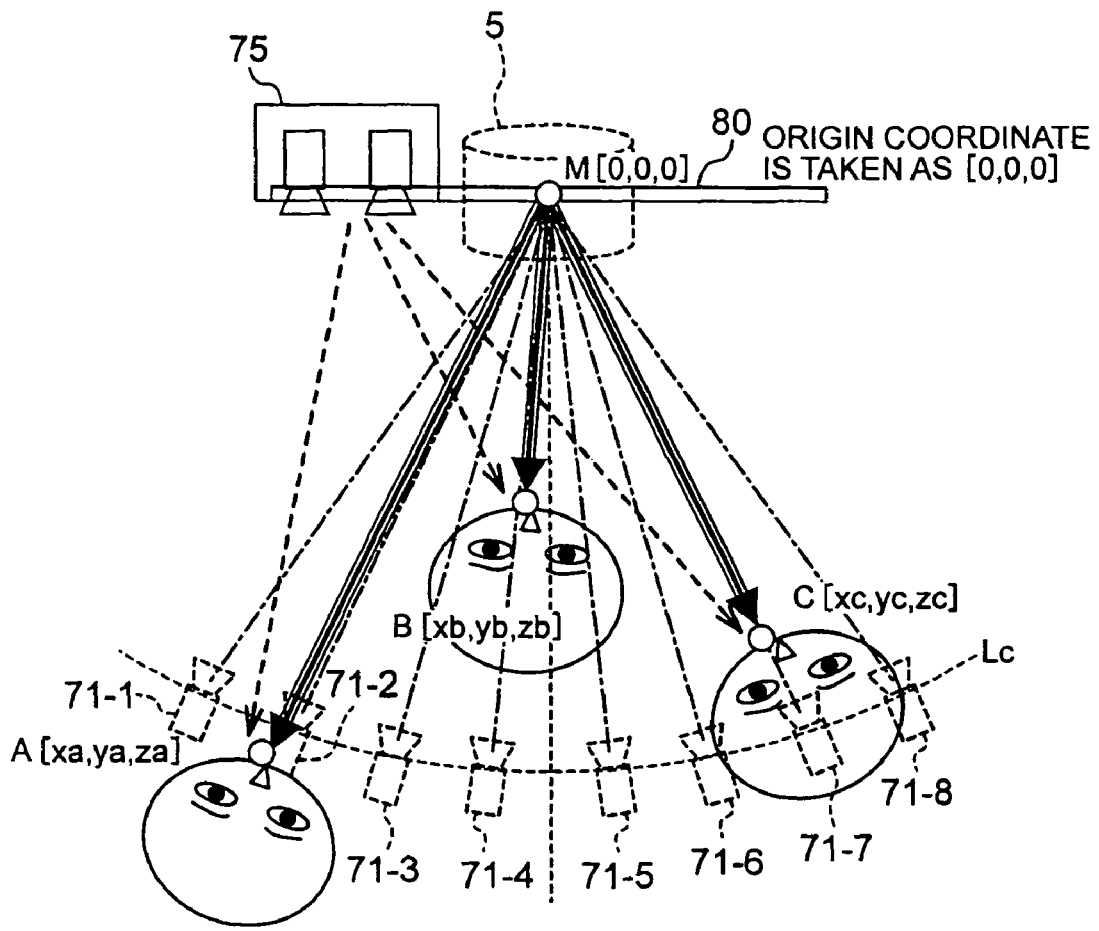
FIG. 12 explains an example of the implementation of a stereoscopic view.

FIG. 12A shows the positional relationship between the object 5 indicated with a dotted line and each camera 71, overlapping the positional relationship between the user's viewpoint and stereoscopic display unit 80 indicated with a solid line. The stereoscopic display unit 80 will provide a stereoscopic view only when the positional relationship between the object 5 and the optical center of each camera 71 coincides with the positional relationship between the viewpoint positions of the user and the stereoscopic display unit 80.

For imaging with the optical axes of the cameras 71-1 to 71-8 aligned with the point M of the object 5 at the coordinates (0, 0, 0), the center of the stereoscopic display unit 80 is placed on the point M so that the coordinates of that center are positioned at the origin (0, 0, 0). Also, coordinates (xn, yn, zn) of the position of the user's head measured by the both-eye position estimation unit 75 are determined based on the origin (0, 0, 0). It should be noted that how to define the position of the user's head may be determined freely by the imaging system 7. For example, the center of the user's forehead may be defined as the head position.

If the user's head is in a position A, the both-eye position estimation unit 75 will determine the positions of the user's left and right eyes on the basis of the coordinates (xa, ya, za) of the position A. When the user's head is in a position B, the both-eye position estimation unit 75 will determine coordinates (xb, yb, zb) of the position B. Also, when the user's head is in a position C, the both-eye position estimation unit 75 will determine coordinates (xc, yc, zc) of the position C. It should be noted that the both-eye position estimation unit 75 recognizes such coordinates and the size of the user's head at the same time.

Figure 12B:
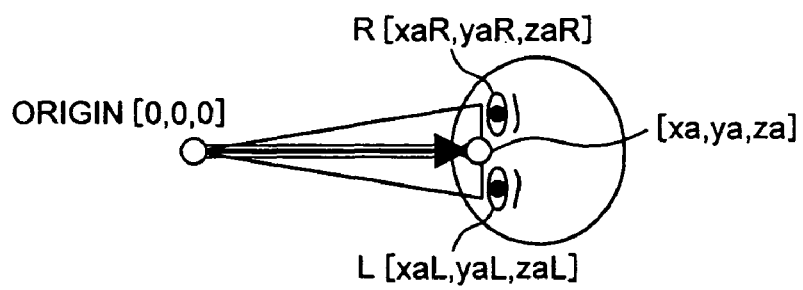

The both-eye position estimation unit 75 estimates the positions of the user's left and right eyes on the basis of the determined coordinates of the position (xn, yn, zn) of the user's head. Coordinates (xaL, yaL, zaL) of the user's left eye and coordinates (xaR, yaR, zaR) of the user's right eye are estimated by reference to the statistical measured data based on the coordinates (xa, ya, za) of the head position A, for example, and the determined size of the user's head as shown in FIG. 12B. Thus, it is possible to determine the coordinates (xaL, yaL, zaL) of the left-eye position and the coordinates (xaR, yaR, zaR) of the right-eye position relative to the coordinates (0, 0, 0) of the center of the stereoscopic display unit 20.

Note here that when the coordinates (xaL, yaL, zaL) of the estimated left-eye position and the coordinates (xaR, yaR, zaR) of the estimated right-eye position are at the optical center of each of the cameras 71-1 to 71-8, each indicated with a dotted line in FIG. 12A, it is possible to provide a stereoscopic view by taking images captured by such cameras as they are as left-eye and right-eye parallax images. In any other case, however, the appropriate positional relationship between the object 5 and the optical center of each camera 71 will not be achieved so that it is difficult for the user to have a stereoscopic view.

When the coordinates (xaL, yaL, zaL) of the estimated left-eye position and the coordinates (xaR, yaR, zaR) of the estimated right-eye position are not at the optical center of each of the cameras 71-1 to 71-8, but are on a line Lc connecting the optical centers of the cameras 71, as shown in FIG. 12A, the above positional relationship can be adjusted by forming only the left-eye parallax image (or right-eye parallel image).

Figure 13:
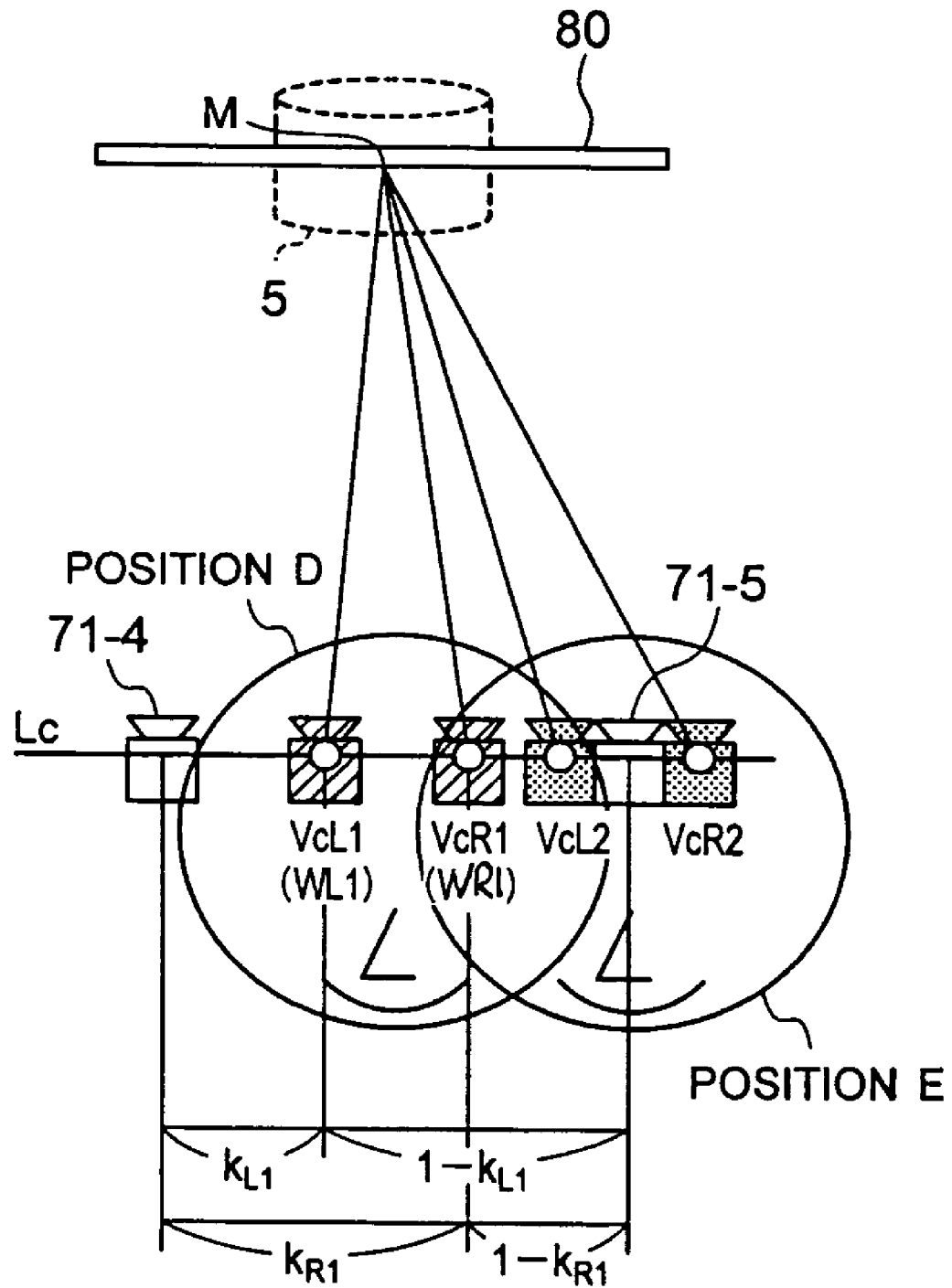
FIG. 13 explains an example of a virtual location of a camera corresponding to the position of a user's viewpoint.

For example, when the user's head is in a position D and the estimated positions of the left and right eyes are at VcL1 and VcR1, respectively, as shown in FIG. 13, the positional relationship is adjusted so that an image formed by imaging the point M of the object 5 (corresponding to the coordinates (0, 0, 0) of the center of the stereoscopic display unit 80) with virtual cameras placed at VcL1 and VcR1, respectively, will be a left-eye parallax image (right-eye parallax image).

In such a case, the information generator 76 acquires the left-eye position VcL1 and the right-eye position VcR1 estimated by the both-eye position estimation unit 75 as described above. Then, the acquired left-eye position VcL1 is assumed to be a virtual position WL1 where the camera is to be placed and this geometry is applied to the positional relationship between the cameras 71-1 to 71-8 actually placed in a positional relationship to the object 5. Similarly, the acquired right-eye position VcR1 is assumed to be a virtual position WR1 where the camera is to be placed and this geometry is applied to the positional relationship between the cameras 71-1 to 71-8 actually placed in a positional relationship to the object 5.

For example, when both the left-eye and the right-eye positions VcL1 and VcR1 are between the cameras 71-4 and 71-5 as shown in FIG. 13, the information generator 76 recognizes the positional relationship between the left-eye and the right-eye positions VcL1 and VcR1 and the cameras 71-4 and 71-5 and generates relative-position information $k_L1$ and $k_R1$ on the basis of the recognized relationship. The relative-position information $k_L1$ means that the virtual position WL1 is at a ratio $k_L1:1-k_L1$ between the cameras 71-4 and 71-5. Similarly, the relative-position information $k_R1$ means that the virtual position WR1 is at a ratio $k_R1:1-k_R1$ between the cameras 71-4 and 71-5. That is, as the relative-position information $k_L1$ and $k_R1$ become smaller, the virtual positions WL1 and WR1 will be nearer to the camera 71-4. As the relative-position information $k_L1$ and $k_R1$ become larger, the virtual positions WL1 and WR1 will be nearer to the camera 71-5.

Thus, in the virtual viewpoint image generator 30, the coordinates (xt, yt) of a pixel mv' in the left-eye parallax image (right-eye parallax image) determined on the basis of the aforementioned equation (11) will be nearer to the coordinates (x1, y1) as the virtual position WL1 (virtual position WR1) moves nearer to the camera 71-4, while it will be nearer to the coordinates (x2, y2) as the virtual position WL1 (virtual position WR1) moves nearer to the camera 71-5.

Also, the brightness component Pt of the pixel mv' in the left-eye parallax image (right-eye parallax image) determined based on the aforementioned equation (12) will be more approximate to J11' as the virtual position WL1 (virtual position WR1) moves nearer to the camera 71-4, while it will be more approximate to J12' as the virtual position WL1 (virtual position WR1) moves nearer to the camera 71-5.

The left-eye parallax image (right-eye parallax image) thus obtained corresponds to an image which would be obtained on the assumption the camera is placed at VcL1 (VcR1). By displaying the parallax images on the stereoscopic display unit 80 via the display controller 79, images captured with the cameras placed in the estimated left-eye and right-eye positions VcL1 and VcR1, respectively, can be supplied as the left-eye and right-eye parallax images, respectively.

Figure 14:
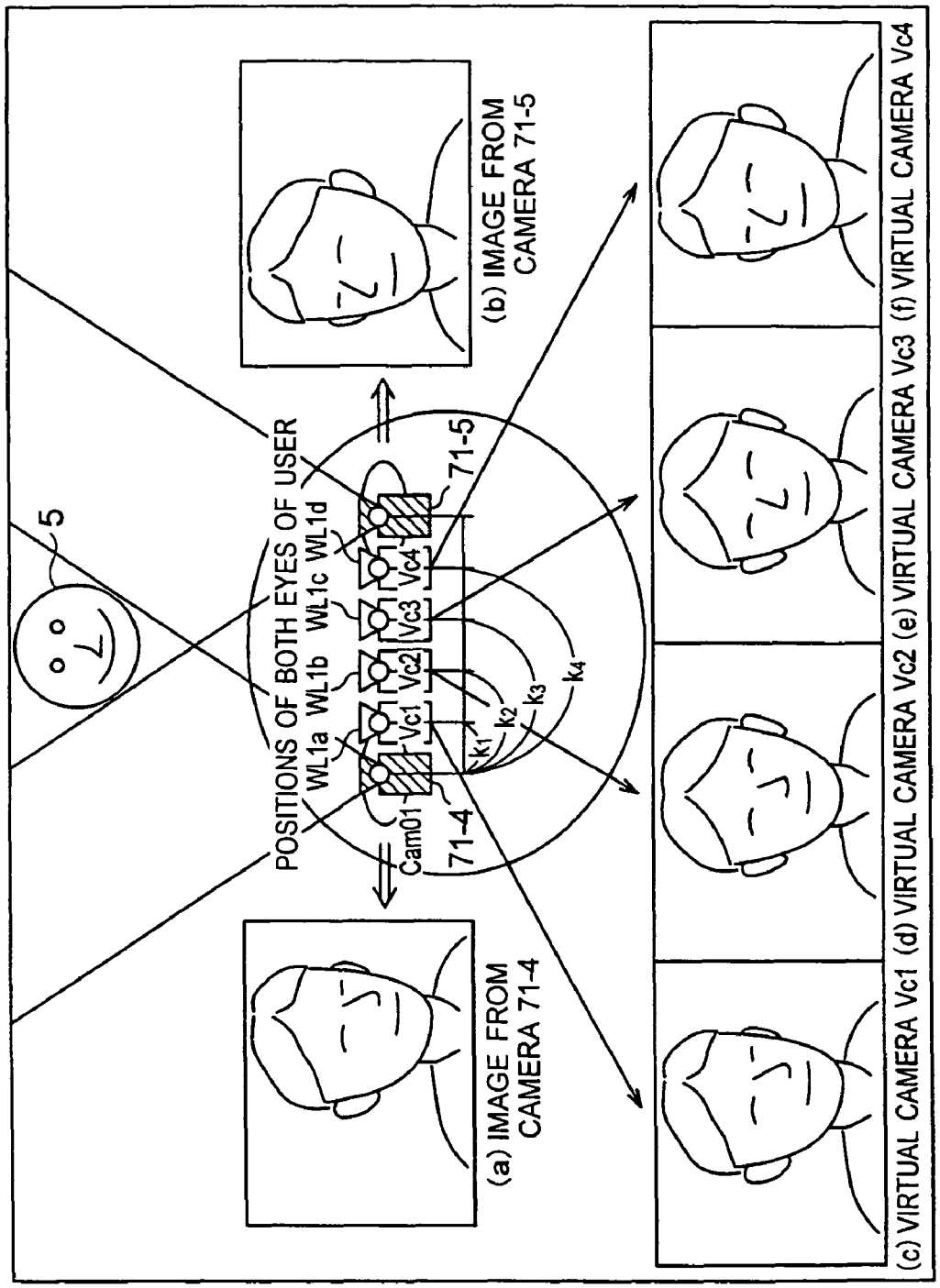
FIG. 14 explains an example of a composition of a left-eye parallax image (right-eye parallax image).

FIG. 14 shows an example of the composition of a left-eye parallax image (right-eye parallax image). It is assumed here that the object 5 is a human face and is imaged by the cameras 71-4 and 71-5. In this case, the camera 71-4 will image the object 5 as an image captured at the right end of its imaging range, while the camera 71-5 will image the object 5, from a point of view different from that of the camera 71-4, as an image captured at the left end of its imaging range. As a result, the image captured by the camera 71-4 will be a person viewing to the right nearly at the right end as shown in FIG. 14, and the image captured by the camera 71-5 will be a person viewing to the left nearly at the left end.

When the relative-position information k is small (k1), the virtual position WL1a (virtual position WR1a) is nearer to the camera 71-4. Also, the virtual position WL1a (WR1a) will assure a left-eye parallax image (right-eye parallax image) determined based on the aforementioned equations (11) and (12) and which is more approximate to an image captured by the camera 71-4.

Also, as the relative-position information gradually increases from k2 to k4, the virtual position will gradually shift from WL1b (virtual position WR1b) toward WL1d (virtual position WR1d), that is, will gradually move nearer to the camera 71-5. Accordingly, the image included in the left-eye parallax image will gradually shift from the right to left end, and the viewing direction of the imaged person will gradually be changed from the right toward the left.

Note here that in the case the coordinates (xaL, yaL, zaL) of the estimated left-eye position and the coordinates (xaR, yaR, zaR) of the estimated right-eye position are not on the line Lc, the positional relationship may be adjusted by increasing or decreasing the field of view of the left-eye parallax image (right-eye parallax image).

In the imaging system 7 capable of the aforementioned stereoscopic viewing, even if an occlusion region arises due to a parallax, the matching unit 29 can provide an accurate matching. Thus, it is possible to eliminate the parallax misalignment accurately and smoothly without any influence of the viewpoint position of the user viewing the stereoscopic display unit 80, and therefore always provide a three-dimensional image which appears more natural.

Also, by generating an arbitrary virtual viewpoint image on a line connecting the centers of the cameras to each other, there can be produced a hologram picture having no parallax misalignment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. An image processor, comprising:
means for providing control information;
an image correcting unit operable to align object images acquired by imaging an object by at least two cameras from different points of view based on said control information to form at least two corrected object images, the corrected object images each including a plurality of horizontal lines and a plurality of pixels on each of the horizontal lines, and the difference in brightness between the corrected object images being minimized through the use of projective transformation matrices corresponding to the object images, the correcting unit being operable to match images from the at least two cameras with a reference image through a projective transformation which is based on at least a chromatic aberration, a distortion, and an optical-axial misalignment of the lens for each of the cameras; and a matching unit operable to determine a correspondence between at least one pixel position on a horizontal line in one of the corrected object images and at least one pixel position on the same horizontal line in another of the corrected object images by determining a similarity in a brightness component and a color component at the pixel positions and a parallax between the corrected object images, in which said control information includes information indicative of a positional relationship of each camera to the object, the information indicative of a positional relationship being generated by using the object images to acquire the line of vision between the object and a display associated with the cameras and generating the information indicative of a positional relationship based on the acquired line of vision, and in which, to determine the correspondence, the matching unit determines whether priority is to be given to the similarity or to the parallax, and the matching unit matches a plurality of pixel positions on the horizontal line in the one of the corrected object images with the same pixel positions on the same horizontal line in the another of the corrected object images when priority is given to the similarity, and the matching unit matches a plurality of pixel positions on the horizontal line in one of the corrected object images with one pixel position on the same horizontal line in the another of the corrected object images when priority is given to the parallax, the control information including, for each camera, at least one of an indication of imaging direction and an indication of angle of view, and the correction unit using the at least one of the indication of imaging direction and the indication of angle of view for performing a geometric normalization of the corrected object images.

2. The image processor according to claim 1, wherein the matching unit weights either the brightness component or the color component at the pixel positions to determine the similarity.

3. The image processor according to claim 1, wherein the matching unit determines the similarity in reflecting the correlation between the brightness component and the color component in pixel positions above and below the horizontal line.

4. The image processor according to claim 1, wherein the matching unit determines the parallax based on a distance from each of the cameras to the object.

5. The image processor according to claim 1, wherein the image correcting unit aligns a line normal to each of the images acquired by the cameras with the direction of a line normal to a virtual plane set on a virtual basis.

6. The image processor according to claim 5, wherein the image correcting unit determines a projective transformation matrix intended for projection of each of the images acquired by the cameras onto the virtual plane and aligns the direction of the line normal to each of the images with the direction of the line normal to the virtual plane based on the projective transformation matrix.

7. The image processor according to claim 1, further comprising:

an information generating unit operable to generate relative-position information indicative of a positional relationship between an optical center of a virtual camera placed on a virtual basis and each of the cameras; and an image generating unit operable to determine positions of pixels forming a virtual viewpoint image to be produced by a virtual camera and the brightness components at the pixel positions in the virtual viewpoint image from the pixel positions matched by the matching unit and the brightness component and the color component in the pixel positions matched by the matching unit based on the relative-position information.

8. An image processing method of using a processor to perform steps comprising:

providing control information;

aligning object images acquired by imaging an object by at least two cameras from different points of view based on said control information to form at least two corrected object images, the corrected object images each including a plurality of horizontal lines and a plurality of pixels on each of the horizontal lines, and the difference in brightness between the corrected object images being minimized through the use of projective transformation matrices corresponding to the object images, a correcting unit being used to match images from the at least two cameras with a reference image through a projective transformation which is based on at least a chromatic aberration, a distortion, and an optical-axial misalignment of the lens for each of the cameras; and using a matching unit for determining a correspondence between at least one pixel position on a horizontal line in one of the corrected object images and at least one pixel position on the same horizontal line in another of the corrected object images by determining a similarity in a brightness component and a color component at the pixel positions and a parallax between the corrected object images, in which said control information includes information indicative of a positional relationship of each camera to the object, the information indicative of a positional relationship being generated by using the object images to acquire the line of vision between the object and a display associated with the cameras and generating the information indicative of a positional relationship based on the acquired line of vision, in which the step of determining the correspondence includes determining whether priority is to be given to the similarity or to the parallax, and in which a plurality of pixel positions on the horizontal line in the one of the corrected object images is matched with the same pixel positions on the same horizontal line in the another of the corrected object images when priority is given to the similarity, and a plurality of pixel positions on the horizontal line in the one of the corrected object images is matched with one pixel position on the same horizontal line in the another of the corrected object images when priority is given to the parallax, the control information including, for each camera, at least one of an indication of imaging direction and an indication of angle of view, and the method further comprising using the at least one of the indication of imaging direction and the indication of angle of view for performing a geometric normalization of the corrected object images.

9. The method according to claim 8, wherein the step of determining the correspondence includes weighting either the brightness component or the color component at the pixel positions to determine the similarity.

10. The method according to claim 8, wherein the step of determining the correspondence includes determining the similarity in reflecting the correlation between the brightness component and the color component in pixel positions above and below the horizontal line.

11. The method according to claim 8, wherein the step of determining the correspondence includes determining the parallax based on a distance from each of the cameras to the object.

12. The method according to claim 8, wherein the aligning step includes aligning a line normal to each of the images acquired by the cameras with the direction of a line normal to a virtual plane set on a virtual basis.

13. The method according to claim 12, wherein the aligning step includes determining a projective transformation matrix intended for projection of each of the images acquired by the cameras onto the virtual plane and aligning the direction of the line normal to each of the images with the direction of the line normal to the virtual plane based on the projective transformation matrix.

14. The method according claim 8, further comprising:
generating relative-position information indicative of a positional relationship between an optical center of a virtual camera placed on a virtual basis and each of the cameras; and
determining positions of pixels forming a virtual viewpoint image to be produced by a virtual camera and the brightness components at the pixel positions in the virtual viewpoint image from the pixel positions matched in the step of determining the correspondence and the brightness component and the color component in the pixel positions matched in the step of determining the correspondence based on the relative-position information.

* * * * *